US011958289B2

(12) United States Patent
Ito

(10) Patent No.: US 11,958,289 B2
(45) Date of Patent: Apr. 16, 2024

(54) LIQUID EJECTING HEAD CONTROL CIRCUIT AND LIQUID EJECTING APPARATUS

(71) Applicant: Seiko Epson Corporation, Tokyo (JP)

(72) Inventor: Sukehiro Ito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 300 days.

(21) Appl. No.: 17/560,672

(22) Filed: Dec. 23, 2021

(65) Prior Publication Data

US 2022/0203674 A1 Jun. 30, 2022

(30) Foreign Application Priority Data

Dec. 25, 2020 (JP) ................................ 2020-217009

(51) Int. Cl.
*B41J 29/38* (2006.01)
*B41J 2/045* (2006.01)

(52) U.S. Cl.
CPC ......... *B41J 2/0455* (2013.01); *B41J 2/04541* (2013.01)

(58) Field of Classification Search
CPC ... B41J 2/0455; B41J 2/04541; B41J 2/04578
See application file for complete search history.

(56) References Cited

U.S. PATENT DOCUMENTS 6,685,293 B2 * 2/2004 Junhua ................ B41J 2/04596 347/14
6,758,544 B2 7/2004 Fukano
2002/0158926 A1 10/2002 Fukano
2003/0117454 A1 * 6/2003 Junhua ................ B41J 2/04578 347/19
2006/0071961 A1 * 4/2006 Tamura ................ B41J 2/04541 347/10
2020/0198334 A1 6/2020 Ito et al.

FOREIGN PATENT DOCUMENTS

JP 2003-001824 A 1/2003
JP 2020-104507 A 7/2020

* cited by examiner

*Primary Examiner* — Lam S Nguyen
(74) *Attorney, Agent, or Firm* — Harness, Dickey & Pierce, P.L.C.

(57) ABSTRACT

A liquid ejecting head control circuit controls a liquid ejecting head and a switching circuit. The liquid ejecting head control circuit includes a drive signal output circuit, and a switching control circuit. The switching control circuit outputs an ejection control signal defining an amount of a liquid to be ejected from a nozzle, a switching timing signal defining switching timing of the switching circuit, and a state selection signal defining a state of the switching circuit in a control period defined by the switching timing signal. The state selection signal for a first time period for which the liquid ejecting head is controlled so as to eject the liquid from the nozzle is different from the state selection signal for a second time period for which the liquid ejecting head is controlled so as not to eject the liquid from the nozzle.

6 Claims, 11 Drawing Sheets

FIG. 6
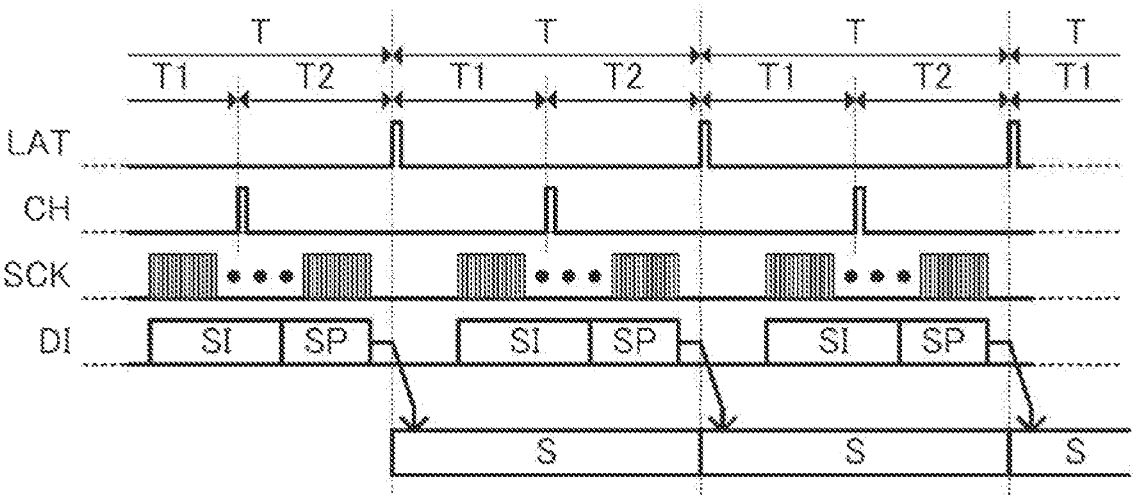
FIG. 7
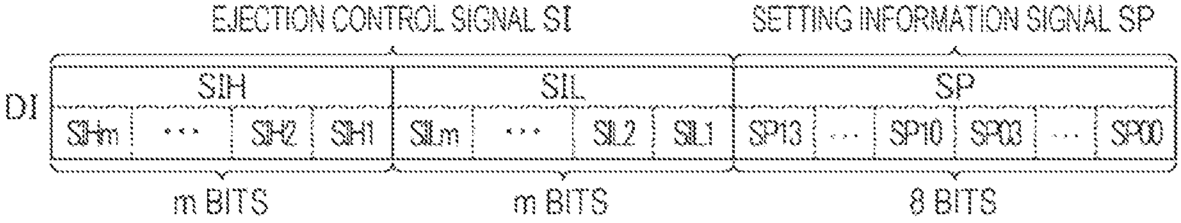
FIG. 8
| [LTa, LTb] ([SIH, SIL]) | S | |
|---|---|---|
| | T1(Q1) | T2(Q2) |
| [1, 1] | q00 | q10 |
| [1, 0] | q01 | q11 |
| [0, 1] | q02 | q12 |
| [0, 1] | q03 | q13 |

FIG. 11

| | EJECTION CONTROL SIGNAL SI | | | | | | SETTING INFORMATION SIGNAL SP | | | | | | | |
|---|---|---|---|---|---|---|---|---|---|---|---|---|---|---|
| | SIH | | | SIL | | | SP | | | | | | | |
| | SIHm | ⋯ | SIH1 | SILm | ⋯ | SIL1 | Q2 | | | | Q1 | | | |
| | | | | | | | q13 | q12 | q11 | q10 | q03 | q02 | q01 | q00 |
| DIA | 0/1 | ⋯ | 0/1 | 0/1 | ⋯ | 0/1 | 0 | 0 | 0 | 1 | 0 | 0 | 1 | 1 |
| DIB | 0/1 | ⋯ | 0/1 | 0/1 | ⋯ | 0/1 | 0 | 1 | 1 | 0 | 1 | 0 | 0 | 0 |

FIG. 12

| [LTa, LTb] ([SIH, SIL]) | Sa | |
|---|---|---|
| | Ta1 | Ta2 |
| [1, 1] | 1 | 1 |
| [1, 0] | 1 | 0 |
| [0, 1] | 0 | 0 |
| [0, 1] | 0 | 0 |

FIG. 13

| [LTa, LTb] ([SIH, SIL]) | Sb | |
|---|---|---|
| | Tb1 | Tb2 |
| [1, 1] | 0 | 0 |
| [1, 0] | 0 | 1 |
| [0, 1] | 0 | 1 |
| [0, 1] | 1 | 0 |

FIG. 16

| | COMMAND SIGNAL CMD (p BITS) | | | PSEUDO SETTING INFORMATION SIGNAL DSP | | | | | | | |
|---|---|---|---|---|---|---|---|---|---|---|---|
| | | | | DQ2 | | | | DQ1 | | | |
| | Cd1 | ... | Cdp | dq13 | dq12 | dq11 | dq10 | dq03 | dq02 | dq01 | dq00 |
| DIA | 0/1 | ... | 0/1 | 1 | 1 | 1 | 1 | 1 | 1 | 1 | 1 |
| DIB | 0 | ... | 0 | 0 | 0 | 0 | 0 | 0 | 0 | 0 | 0 |

FIG. 17

| [LTa, LTb] | Sa | |
|---|---|---|
| | Ta1 | Ta2 |
| [1, 1] | 1 | 1 |
| [1, 0] | 1 | 1 |
| [0, 1] | 1 | 1 |
| [0, 1] | 1 | 1 |

FIG. 18

| [LTa, LTb] | Sb | |
|---|---|---|
| | Tb1 | Tb2 |
| [1, 1] | 0 | 0 |
| [1, 0] | 0 | 0 |
| [0, 1] | 0 | 0 |
| [0, 1] | 0 | 0 |

LIQUID EJECTING HEAD CONTROL CIRCUIT AND LIQUID EJECTING APPARATUS

The present application is based on, and claims priority from JP Application Serial Number 2020-217009, filed Dec. 25, 2020, the disclosure of which is hereby incorporated by reference herein in its entirety.

BACKGROUND

1. Technical Field

The present disclosure relates to a liquid ejecting head control circuit and a liquid ejecting apparatus.

2. Related Art

As a liquid ejecting apparatus such as an ink jet printer, a so-called piezoelectric liquid ejecting apparatus is known, which drives a drive element including a piezoelectric element included in a liquid ejecting head by using a drive signal to eject a liquid such as ink stored in a cavity from a nozzle so as to form a character or an image on a medium.

For such a liquid ejecting apparatus, a configuration is known, which can be set and changed based on a liquid ejecting head to be used and a characteristic of a liquid, such as ink, to be ejected from the liquid ejecting head by outputting information defining the amount of the liquid to be ejected from the liquid ejecting head from a liquid ejecting head control circuit that controls driving of the liquid ejecting head. For example, JP-A-2003-001824 discloses an ink jet printer that can control the amount of ink to be ejected for each ink color in a printing cycle by transmitting a pattern of ejection from a nozzle from a printer controller (liquid ejecting head control circuit) to a print head (liquid ejecting head).

JP-A-2020-104507 discloses a liquid ejecting apparatus that includes a liquid ejecting head that has a diagnosing circuit configured to diagnose the state of the liquid ejecting head and performs self-diagnosis based on a latch signal LAT, a change signal Cha, a clock signal SCK, and a print data signal SI that have been input to the diagnosing circuit.

However, when a function of controlling such a pattern of ejection from a nozzle as described in JP-A-2003-001824 by transmitting the pattern of ejection from the nozzle from a liquid ejecting head control circuit to a liquid ejecting head is implemented in a liquid ejecting apparatus and the liquid ejecting head control circuit that are configured to cause the liquid ejecting head to execute control that is such self-diagnosis as described in JP-A-2020-104507 or the like and is not liquid ejection, a signal to execute the control other than liquid ejection and a signal to define the pattern of ejection from the nozzle are common signals and thus an erroneous operation may occur in the liquid ejecting apparatus.

SUMMARY

According to an aspect of the present disclosure, a liquid ejecting head control circuit controls a liquid ejecting head that includes a drive element that is driven based on a drive signal to cause a liquid to be ejected from a nozzle, and a switching circuit that switches whether to supply the drive signal to the drive element. The liquid ejecting head control circuit includes a drive signal output circuit that outputs the drive signal, and a switching control circuit that controls the switching circuit. The switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal. The state selection signal for a first time period for which the liquid ejecting head is controlled so as to eject the liquid from the nozzle is different from the state selection signal for a second time period for which the liquid ejecting head is controlled so as not to eject the liquid from the nozzle.

According to another aspect of the present disclosure, a liquid ejecting apparatus includes a liquid ejecting head including a drive element that is driven based on a drive signal to cause a liquid to be ejected from a nozzle, and a switching circuit that switches whether to supply the drive signal to the drive element, and a liquid ejecting head control circuit that controls the liquid ejecting head. The liquid ejecting head control circuit includes a drive signal output circuit that outputs the drive signal, and a switching control circuit that controls the switching circuit. The switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal. The state selection signal for a first time period for which the liquid ejecting head is controlled so as to eject the liquid from the nozzle is different from the state selection signal for a second time period for which the liquid ejecting head is controlled so as not to eject the liquid from the nozzle.

BRIEF DESCRIPTION OF THE DRAWINGS

FIG. 6 is a diagram describing a latch signal, a change signal, a clock signal, and a head control signal.

FIG. 7 is a diagram illustrating an example of a data configuration of the head control signal.

FIG. 8 is a diagram illustrating details of decoding by each decoder.

FIG. 11 is a diagram illustrating an example of head control signals output by a control mechanism in an ejection control period.

FIG. 12 is a diagram illustrating details of decoding by each decoder included in a selection control circuit in the ejection control period.

FIG. 13 is a diagram illustrating details of decoding by each decoder included in a selection control circuit in the ejection control period.

FIG. 16 is a diagram illustrating an example of the head control signals output by the control mechanism in a non-ejection control period.

FIG. 17 is a diagram illustrating details of decoding by each decoder included in the selection control circuit in a non-ejection control period.

FIG. 18 is a diagram illustrating details of decoding by each decoder included in the selection control circuit in the non-ejection control period.

DESCRIPTION OF EXEMPLARY EMBODIMENTS

Hereinafter, an embodiment of the present disclosure is described with reference to the drawings. The drawings are for illustrative purposes. The embodiment described below does not unduly limit features of the present disclosure that are described in the claims. In addition, not all of configurations described below are necessarily essential configuration requirements of the present disclosure.

1. Overview of Liquid Ejecting Apparatus

Figure 1:
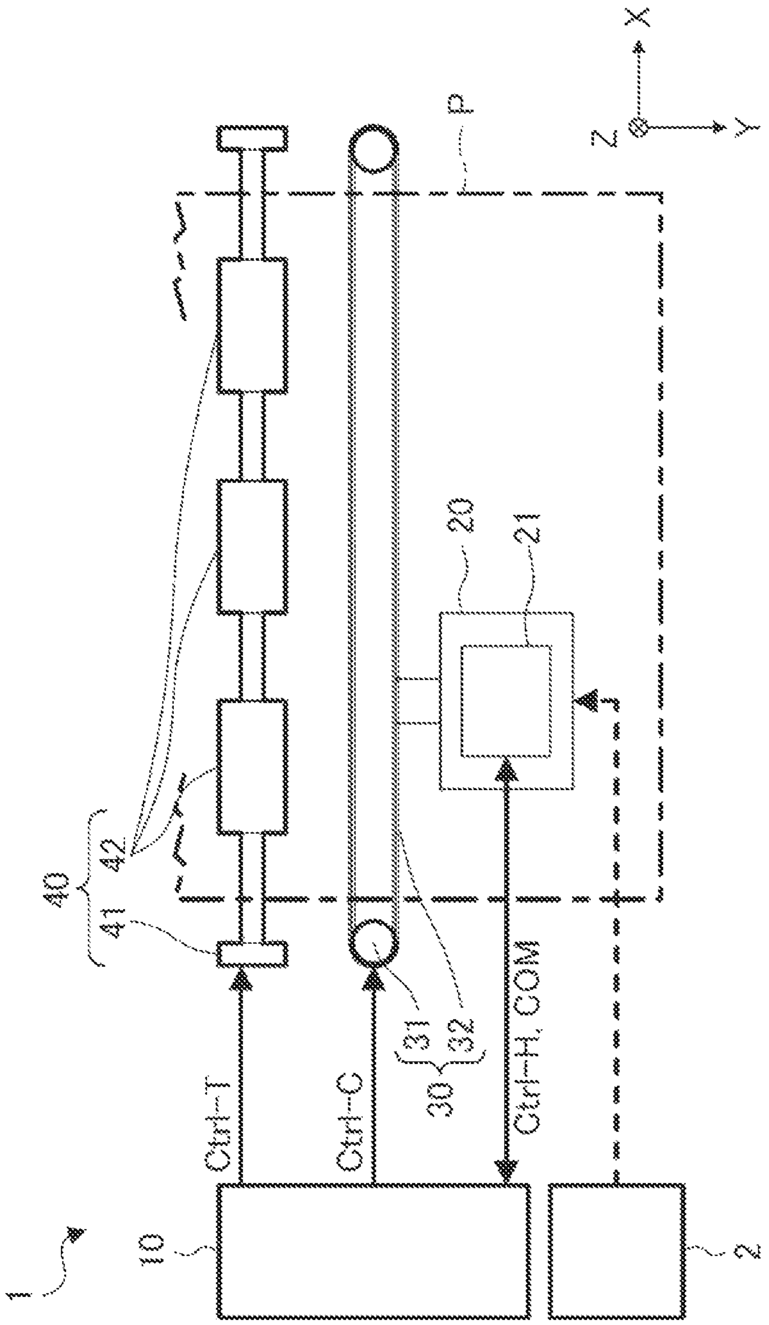
FIG. 1 is a diagram illustrating a schematic configuration of a liquid ejecting apparatus.

FIG. 1 is a diagram illustrating a schematic configuration of a liquid ejecting apparatus 1. As the liquid ejecting apparatus 1 according to the embodiment, a serial printing type ink jet printer is exemplified. In the ink jet printer, a carriage 20 on which a liquid ejecting head 21 that ejects ink as an example of a liquid is mounted reciprocates, and the liquid ejecting head 21 ejects the ink onto a transported medium P to form an image on the medium P. In the following description, a direction in which the carriage 20 moves is defined as an X direction, a direction in which the medium P is transported is defined as a Y direction, a direction in which the ink is ejected is defined as a Z direction, and the X, Y, and Z directions are orthogonal to each other. However, various components constituting the liquid ejecting apparatus 1 may not be arranged in directions orthogonal to each other. As the medium P, any print medium such as print paper, a resin film, or fabric cloth may be used. The liquid ejecting apparatus 1 may be a so-called line printing type ink jet printer in which liquid ejecting heads 21 are arranged side by side such that nozzle arrays are formed in a region with a width equal to or larger than the width of the medium and the liquid ejecting heads 21 eject ink onto the transported medium to form a desired image on the medium.

As illustrated in FIG. 1, the liquid ejecting apparatus 1 includes an ink container 2, a control mechanism 10, the carriage 20, a moving mechanism 30, and a transport mechanism 40.

In the ink container 2, a plurality of types of ink to be ejected onto the medium P are stored. Colors of the ink stored in the ink container 2 are, for example, black, cyan, magenta, yellow, red, and gray. As the ink container 2 for storing such ink, an ink cartridge, a bag-shaped ink pack formed of a flexible film, an ink tank that can be filled with the ink, and the like can be used.

The control mechanism 10 includes a processing circuit such as a central processing unit (CPU) or a field programmable gate array (FPGA) and a storage circuit such as a semiconductor memory and controls components of the liquid ejecting apparatus 1 including the liquid ejecting head 21.

The liquid ejecting head 21 is mounted on the carriage 20. The carriage 20 is fixed to an endless belt 32 included in the moving mechanism 30. The ink container 2 may be mounted on the carriage 20.

A control signal Ctrl-H output by the control mechanism 10 to control the liquid ejecting head 21, and one or multiple drive signals COM output by the control mechanism 10 to drive the liquid ejecting head 21 are input to the liquid ejecting head 21. The liquid ejecting head 21 ejects the ink supplied from the ink container 2 based on the input control signal Ctrl-H and the input one or multiple drive signals COM.

The moving mechanism 30 includes a carriage motor 31 and the endless belt 32. The carriage motor 31 operates based on a control signal Ctrl-C input from the control mechanism 10. The endless belt 32 rotates in accordance with the operation of the carriage motor 31. The rotation of the endless belt 32 causes the carriage 20 fixed to the endless belt 32 to reciprocate in the X direction.

The transport mechanism 40 includes a transport motor 41 and a transport roller 42. The transport motor 41 operates based on a control signal Ctrl-T input from the control mechanism 10. The transport roller 42 rotates in accordance with the operation of the transport motor 41. As the transport roller 42 rotates, the medium P is transported in the Y direction.

As described above, in the liquid ejecting apparatus 1, the liquid ejecting head 21 mounted on the carriage 20 ejects the ink in the Z direction in coordination with the transport of the medium P by the transport mechanism 40 and the reciprocation of the carriage 20 by the moving mechanism 30 such that the ink lands at any position on a surface of the medium P to form a desired image on the medium P.

2. Functional Configuration of Liquid Ejecting Apparatus

Figure 2:
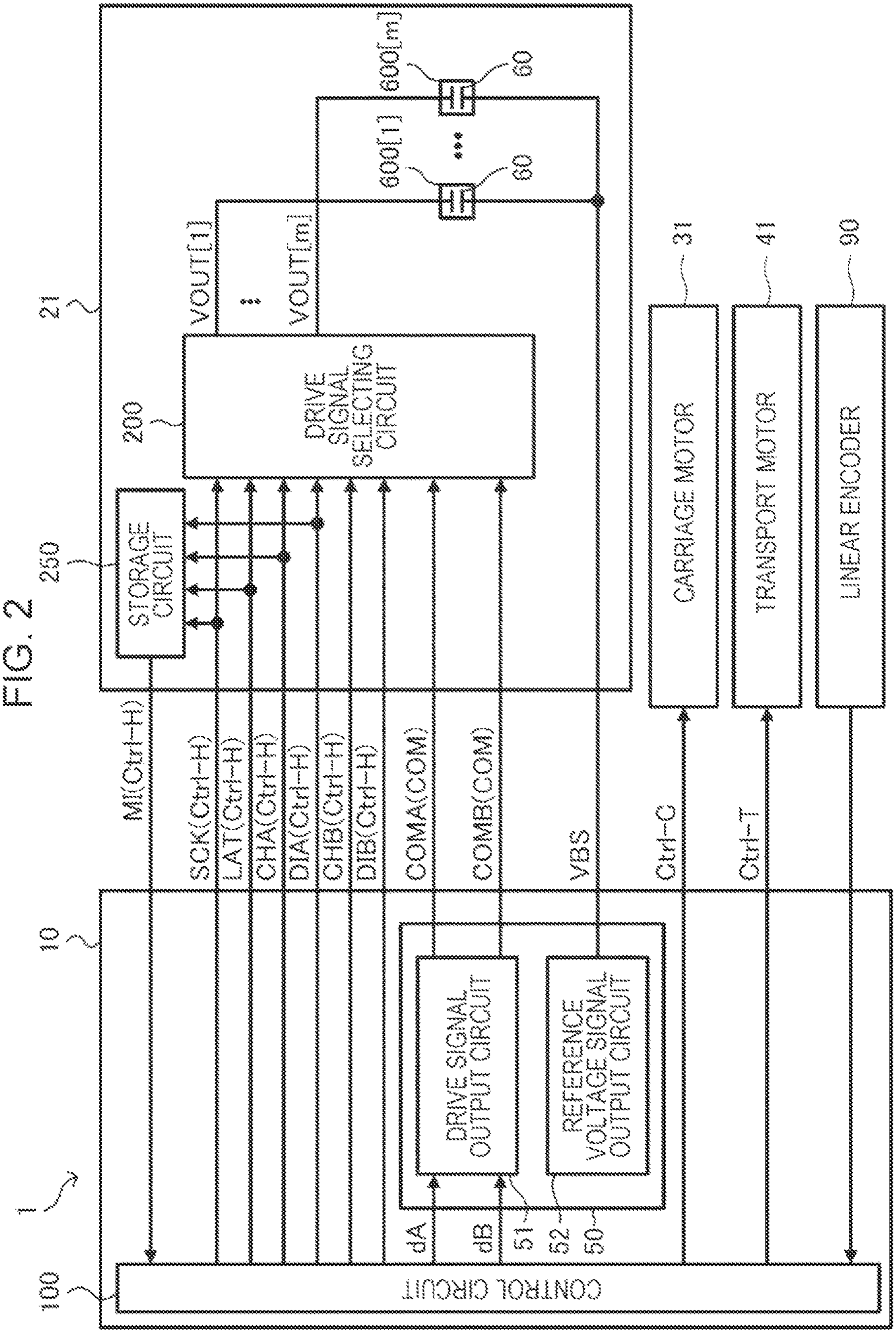
FIG. 2 is a diagram illustrating a functional configuration of the liquid ejecting apparatus.

Next, a functional configuration of the liquid ejecting apparatus 1 is described. FIG. 2 is a diagram illustrating the functional configuration of the liquid ejecting apparatus 1. As illustrated in FIG. 2, the liquid ejecting apparatus 1 includes the control mechanism 10, the liquid ejecting head 21, the carriage motor 31, the transport motor 41, and a linear encoder 90.

The control mechanism 10 includes a drive circuit 50 and a control circuit 100. The control circuit 100 includes, for example, a processor such as a micro-controller. The control circuit 100 generates, based on various signals such as image data input from a host computer connected to and able to communicate with an external or the like, various data to control the liquid ejecting apparatus 1 and a signal based on the data, and outputs the generated data and the generated signal to a corresponding configuration.

A specific example of the operation of the control circuit 100 is described. The control circuit 100 recognizes a scan position of the liquid ejecting head 21 mounted on the carriage 20 based on a detection signal input from the linear encoder 90. Then, the control circuit 100 generates various signals corresponding to the scan position of the liquid ejecting head 21 and outputs the signals. Specifically, the control circuit 100 generates the control signal Ctrl-C to control the reciprocation of the liquid ejecting head 21 and outputs the control signal Ctrl-C to the carriage motor 31. In addition, the control circuit 100 generates the control signal Ctrl-T to control the transport of the medium P and outputs the control signal Ctrl-T to the transport motor 41. The control signal Ctrl-C may be converted via a driver circuit not illustrated and may be input to the carriage motor 31. Similarly, the control signal Ctrl-T may be converted via a driver circuit not illustrated and may be input to the transport motor 41.

The control circuit 100 generates, as the control signal Ctrl-H to control the liquid ejecting head 21, head control signals DIA and DIB, change signals CHA and CHB, a latch signal LAT, and a clock signal SCK based on the various signals such as the image data input from the host computer and the scan position of the liquid ejecting head 21, and outputs the head control signals DIA and DIB, the change signals CHA and CHB, the latch signal LAT, and the clock signal SCK to the liquid ejecting head 21.

The control circuit 100 outputs original drive signals dA and dB to the drive circuit 50. The original drive signals dA and dB are digital signals.

The drive circuit 50 includes a drive signal output circuit 51 and a reference voltage signal output circuit 52. The original drive signals dA and dB are input to the drive signal output circuit 51. The drive signal output circuit 51 converts each of the original drive signals dA and dB from a digital signal to an analog signal, performs class D amplification on the converted analog signals to generate drive signals COMA and COMB as drive signals COM, and outputs the drive signals COMA and COMB. That is, the original drive signal dA is a digital signal defining the waveform of the drive signal COMA, and the original drive signal dB is a digital signal defining the waveform of the drive signal COMB. The drive signal output circuit 51 performs class D amplification on the waveform defined by the original drive signal dA to generate the drive signal COMA and outputs the drive signal COMA. In addition, the drive signal output circuit 51 performs class D amplification on the waveform defined by the original drive signal dB to generate the drive signal COMB and outputs the drive signal COMB. That is, the drive signal output circuit 51 includes two sets of class D amplifying circuits. It is sufficient if the original drive signals dA and dB define the waveforms of the drive signals COMA and COMB, respectively. For example, the original drive signals dA and dB may be analog signals. In addition, it is sufficient if the drive signal output circuit 51 amplifies the waveforms defined by the original drive signals dA and dB. For example, the drive signal output circuit 51 may include a class A amplifying circuit, a class B amplifying circuit, a class AB amplifying circuit, or the like.

The reference voltage signal output circuit 52 outputs a reference voltage signal VBS indicating a reference potential for the drive signals COMA and COMB. The reference voltage signal VBS may be a ground potential signal having a voltage value of 0V or may be a direct-current voltage signal having a voltage value of 5.5V, 6V, or the like.

The drive signals COMA and COMB output by the drive circuit 50 and the reference voltage signal VBS output by the drive circuit 50 are input to the liquid ejecting head 21.

The liquid ejecting head 21 includes a drive signal selecting circuit 200, a storage circuit 250, and ejectors 600[1] to 600[*m*]. The ejectors 600[1] to 600[*m*] have the same configuration. When the ejectors 600[1] to 600[*m*] do not need to be distinguished, the ejectors 600[1] to 600[*m*] may be merely referred to as ejectors 600.

Information on the liquid ejecting head 21 is stored in the storage circuit 250. Specifically, in the storage circuit 250, various information is stored, which is information on a usage status of the liquid ejecting head 21, such as the number of surfaces of media P to which the liquid ejecting head 21 ejected the ink and an elapsed time period from the time when the liquid ejecting head 21 is coupled to the control mechanism 10, a production lot of the liquid ejecting head 21, information on initial characteristics of the ejectors 600 and the like, and information to be used to increase the accuracy of driving the liquid ejecting head 21, such as a variation in characteristics of the ejectors 600 included in the liquid ejecting head 21 and a correction value corresponding to the variation.

The head control signal DIA, the change signal CHA, the latch signal LAT, and the clock signal SCK are supplied to the storage circuit 250. The storage circuit 250 stores information to be transmitted based on the head control signal DIA, the change signal CHA, the latch signal LAT, and the clock signal SCK, and outputs, to the control circuit 100 included in the control mechanism 10, information serving as read information MI and requested based on the head control signal DIA, the change signal CHA, the latch signal LAT, and the clock signal SCK.

The drive signal selecting circuit 200 is configured as, for example, an integrated circuit device. The clock signal SCK, the latch signal LAT, the change signals CHA and CHB, the head control signals DIA and DIB, and the drive signals COMA and COMB are input to the drive signal selecting circuit 200. The drive signal selecting circuit 200 generates drive signals VOUT[1] to VOUT[m] by selecting or unselecting the drive signals COMA and COMB based on the clock signal SCK, the latch signal LAT, the change signals CHA and CHB, and the input control signals DIA and DIB, and outputs the drive signals VOUT[1] to VOUT[m] to the corresponding ejectors 600[1] to 600[*m*]. When the drive signals VOUT[1] to VOUT[m] do not need to be distinguished, the drive signals VOUT[1] to VOUT[m] may be merely referred to as drive signals VOUT.

Figure 3:
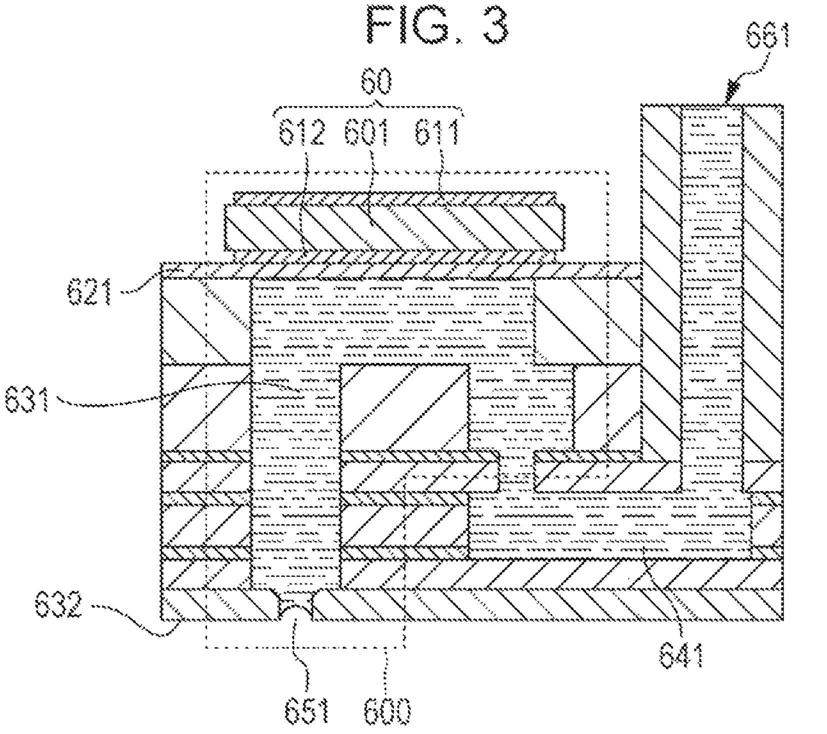
FIG. 3 is a diagram describing a schematic configuration of an ejector.

Each of the ejectors 600 includes a piezoelectric element 60 to which a drive signal VOUT is supplied. FIG. 3 is a diagram describing a schematic configuration of the ejector 600. As illustrated in FIG. 3, the ejector 600 includes the piezoelectric element 60, a diaphragm 621, a cavity 631, and a nozzle 651. The cavity 631 is filled with the ink supplied from a reservoir 641. The ink is introduced into the reservoir 641 from the ink container 2 through a supply port 661.

The diaphragm 621 is displaced by driving of the piezoelectric element 60 disposed on an upper surface of the diaphragm 621, as illustrated in FIG. 3. As the diaphragm 621 is displaced, an internal volume of the cavity 631 filled with the ink increases or decreases. That is, the diaphragm 621 functions as a diaphragm that changes the internal volume of the cavity 631. The nozzle 651 is an opening portion disposed in a nozzle plate 632 and communicates with the cavity 631. When the internal volume of the cavity 631 changes, the ink in an amount corresponding to the change in the internal volume of the cavity 631 is introduced into the cavity 631 and ejected from the nozzle 651.

The piezoelectric element 60 has a structure in which a piezoelectric body 601 is disposed between a pair of electrodes 611 and 612. When the drive signal VOUT is supplied to the electrode 611 of the piezoelectric element 60, and the reference voltage signal VBS is supplied to the electrode 612, the piezoelectric body 601 and central portions of the electrodes 611 and 612 are displaced together with the diaphragm 621 in a vertical direction based on the difference between the voltages supplied to the electrodes 611 and 612. That is, the piezoelectric element 60 is driven by the supply of the drive signal VOUT based on the drive signals COMA and COMB.

In the ejector 600 configured in the aforementioned manner, when the piezoelectric element 60 bends toward the upper side, the diaphragm 621 is displaced toward the upper side such that the internal volume of the cavity 631 increases. Therefore, the ink stored in the reservoir 641 is drawn into the cavity 631. On the other hand, when the piezoelectric element 60 bends toward the lower side, the diaphragm 621 is displaced toward the lower side such that the internal volume of the cavity 631 decreases. Then, the ink in an amount corresponding to the decrease in the internal volume of the cavity 631 is ejected from the nozzle 651 communicating with the cavity 631. The piezoelectric element 60 is not limited to the structure illustrated in FIG. 3. It is sufficient if the piezoelectric element 60 has a structure in which the ink is ejected from the nozzle 651 when the piezoelectric element 60 is driven.

As described above, the liquid ejecting apparatus 1 according to the embodiment includes the liquid ejecting head 21 and the control mechanism 10. The liquid ejecting head 21 includes the piezoelectric elements 60 that are driven by the drive signals VOUT generated based on the drive signals COMA and COMB to cause the ink to be ejected from the nozzles 651, and the drive signal selecting circuit 200 that switches whether to supply the drive signals COMA and COMB to the piezoelectric elements 60. The control mechanism 10 includes the drive signal output circuit 51 that outputs the drive signals COMA and COMB, and the control circuit 100 that outputs the clock signal SCK, the latch signal LAT, the change signals CHA and CHB (also referred to as change signals CH), and the head control signals DIA and DIB (also referred to as head control signals DI) to control the drive signal selecting circuit 200. The liquid ejecting head 21 is controlled under control by the control mechanism 10 such that the ink lands at a desired position on the medium P to form a desired image on the medium P.

The piezoelectric elements 60 are an example of a drive element. The drive signal selecting circuit 200 is an example of a switching circuit. The control mechanism 10 that controls the liquid ejecting head 21 is an example of a liquid ejecting head control circuit. The control circuit 100 that outputs the clock signal SCK, the latch signal LAT, the change signals CH, and the head control signals DIA and DIB to control the drive signal selecting circuit 200 is an example of a switching control circuit. The drive signal COMA output by the drive signal output circuit 51 is an example of a drive signal. Although the embodiment describes the case where the liquid ejecting apparatus 1 includes the single liquid ejecting head 21 as an example, the liquid ejecting apparatus 1 may include a plurality of liquid ejecting heads 21.

3. Configuration of Drive Signal Selecting Circuit

Figure 4:
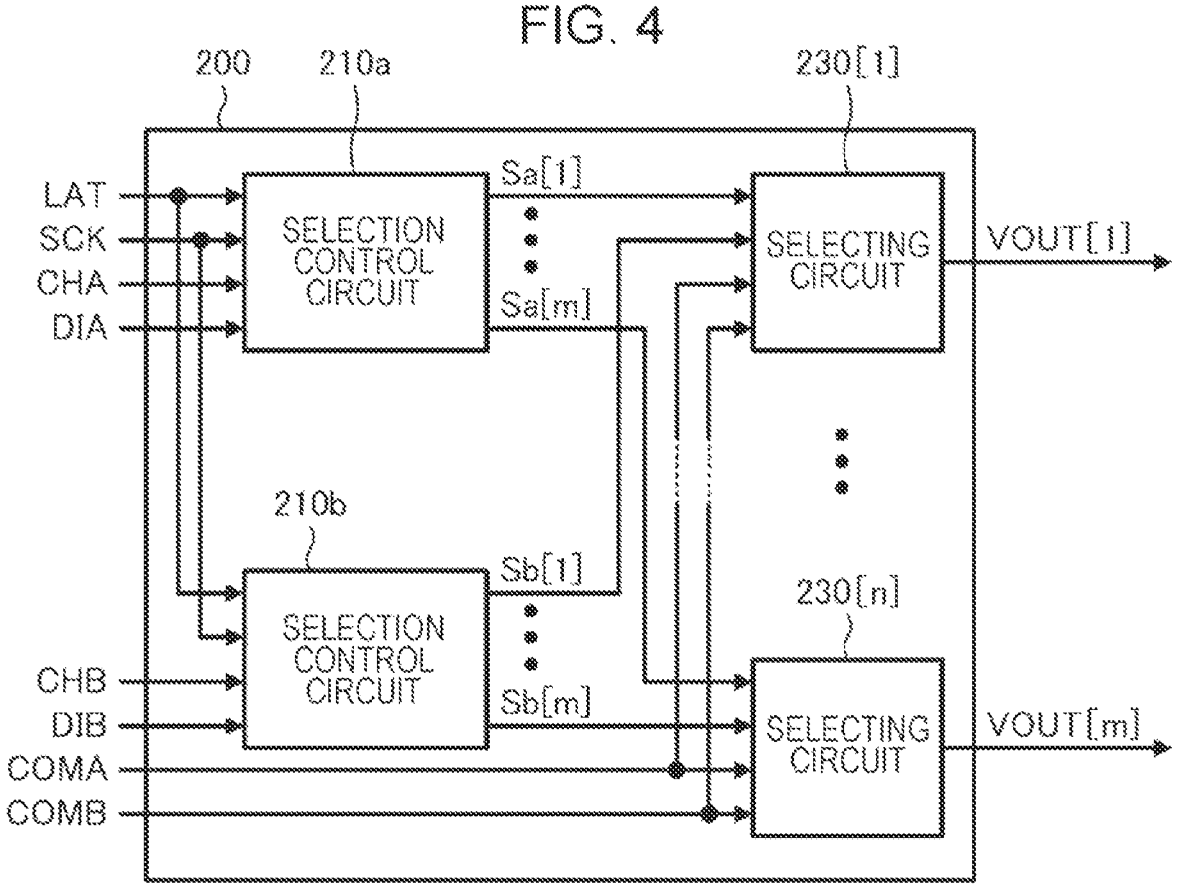
FIG. 4 is a diagram illustrating a configuration of a drive signal selecting circuit.

Next, a configuration of the drive signal selecting circuit 200 is described. FIG. 4 is a diagram illustrating the configuration of the drive signal selecting circuit 200. As illustrated in FIG. 4, the drive signal selecting circuit 200 includes selection control circuits 210*a* and 210*b* and selecting circuits 230[1] to **230[*m*]**.

The clock signal SCK, the latch signal LAT, the change signal CHA, and the control signal DIA are input to the selection control circuit 210*a*. The selection control circuit 210*a* outputs selection signals Sa[1] to Sa[m] to switch whether each of the selecting circuits 230[1] to **230[*m*]** described later outputs the drive signal COMA as the drive signal VOUT, based on the clock signal SCK, the latch signal LAT, the change signal CHA, and the head control signal DIA.

In addition, the clock signal SCK, the latch signal LAT, the change signal CHB, and the head control signal DIB are input to the selection control circuit 210*b*. The selection control circuit 210*b* outputs selection signals Sb[1] to Sb[m] to switch whether each of the selecting circuits 230[1] to **230[*m*]** described later outputs the drive signal COMB as the drive signal VOUT, based on the clock signal SCK, the latch signal LAT, the change signal CHB, and the head control signal DIB.

The selecting circuits 230[1] to **230[*m*] are provided corresponding to the ejectors 600[1] to 600[*m*]. The selecting circuits 230[1] to 230[*m*] switch whether to output the drive signal COMA as the drive signals VOUT[1] to VOUT [m] based on the selection signals Sa[1] to Sa[m] output by the selection control circuit 210***a*, and switch whether to output the drive signal COMB as the drive signals VOUT[1] to VOUT[m] based on the selection signals Sb[1] to Sb[m] output by the selection control circuit 210*b*.

Specifically, the selection signal Sa[1] output by the selection control circuit 210*a*, the selection signal Sb[1] output by the selection control circuit 210*b*, and the drive signals COMA and COMB are input to the selecting circuit 230[1]. The selecting circuit 230[1] selects or unselects the drive signals COMA and COMB based on the selection signals Sa[1] and Sb[1] to generate the drive signal VOUT [1] and outputs the drive signal VOUT[1] to the ejector 600[1]. In addition, the selection signal Sa[m] output by the selection control circuit 210*a*, the selection signal Sb[m] output by the selection control circuit 210*b*, and the drive signals COMA and COMB are input to the selecting circuit **230[*m*]. The selecting circuit 230[*m*] selects or unselects the drive signals COMA and COMB based on the selection signals Sa[m] and Sb[m] to generate the drive signal VOUT [m] and outputs the drive signal VOUT[m] to the ejector 600[*m*]. That is, the selection signal Sa[i] (i is any of 1 to m) output by the selection control circuit 210***a*, the selection signal Sb[i] output by the selection control circuit 210*b*, and the drive signals COMA and COMB are input to the selecting circuit **230[*i*]. Then, the selecting circuit 230[*i*] selects or unselects the drive signals COMA and COMB based on the selection signals Sa[i] and Sb[i] to generate the drive signal VOUT[i] and outputs the drive signal VOUT[i] to the ejector 600[*i*]**.

Next, a specific example of configurations of the selection control circuits 210*a* and 210*b* is described. The selection control circuits 210*a* and 210*b* are different only in signals to be input and output and have the same configuration. Therefore, in the following description, when the selection control circuits 210*a* and 210*b* do not need to be distinguished, the selection control circuits 210*a* and 210*b* are merely referred to as selection control circuits 210. In the following description, it is assumed that the clock signal SCK, the latch signal LAT, the change signal CH, and the head control signal DI are input to each of the selection control circuits 210, and each of the selection control circuits 210 outputs selection signals S[1] to S[m].

Figure 5:
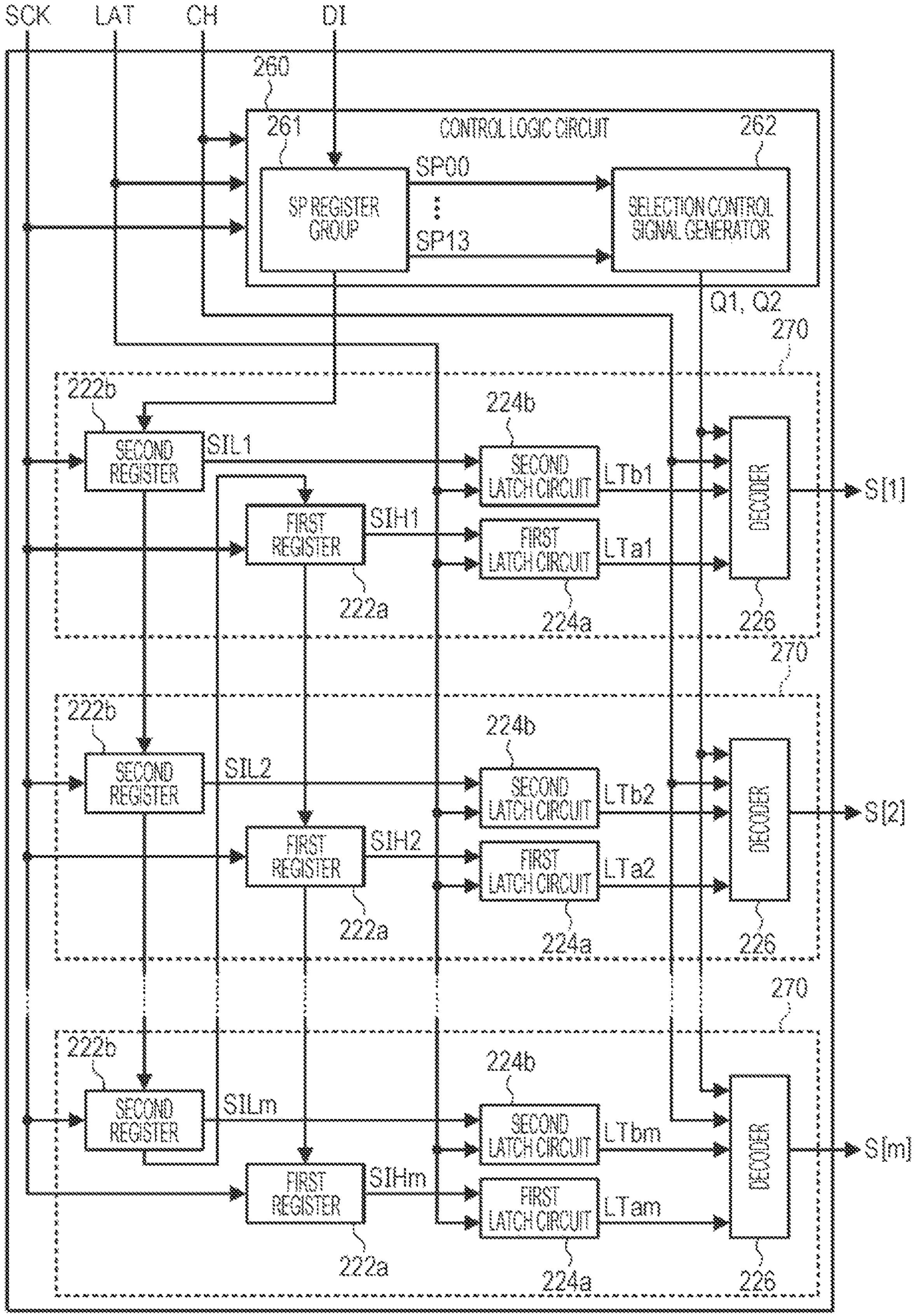
FIG. 5 is a diagram illustrating an electric configuration of a selection control circuit.

FIG. 5 is a diagram illustrating an electric configuration of the selection control circuit 210. As illustrated in FIG. 5, the selection control circuit 210 includes a control logic circuit 260 and a number m of selection control output units 270 provided corresponding to the number m of ejectors 600. That is, the selection control circuit 210 includes the same number m of selection signal output units 270 as the number of ejectors 600 that output the drive signals VOUT. The selection control circuit 210 generates the selection signals S[1] to S[m] corresponding to the ejectors 600[1] to **600[*m*] based on the head control signal DI transmitted in synchronization with the clock signal SCK and outputs the selection signals S[1] to S[m] to the corresponding selecting circuits 230[1] to 230**[*m*] at a time defined by the input latch signal LAT and the change signal CH.

Before the electric configuration of the selection control circuit 210 is described, the latch signal LAT, the change signal CH, the clock signal SCK, and the head control signal DI that are input to the selection control circuit 210 are described. FIG. 6 is a diagram describing the latch signal LAT, the change signal CH, the clock signal SCK, and the head control signal DI.

The latch signal LAT is a pulse signal output by the control circuit 100 based on a signal output by the linear encoder 90 and indicating the scan position of the carriage 20 with the liquid ejecting head 21 mounted thereon. The liquid ejecting head 21 ejects the ink to form a dot on the medium in a time period between pulses of the latch signal LAT. Therefore, the liquid ejecting head 21 can eject a predetermined amount of the ink to form a dot of a desired size at a desired position on the medium P in the main scan direction. A time period from the rising of the latch signal LAT to the next rising of the latch signal corresponds to a dot formation cycle T for formation of a dot on the medium P. That is, the latch signal LAT indicates the scan position of the liquid ejection head 21 with respect to the medium P and defines the dot formation cycle T in which a dot is formed on the medium P according to the scan position of the liquid ejecting head 21.

The change signal CH is a pulse signal defining the timing of switching whether the drive signal selecting circuit 200 supplies the drive signal COM as the drive signals VOUT to the ejectors 600. The control circuit 100 outputs the change signal CH to divide the dot formation cycle T into a plurality of time periods. In the embodiment, it is assumed that the change signal CH is a pulse signal output only once in the dot formation cycle T. That is, in the embodiment, the change signal CH divides the dot formation cycle T into two time periods, a time period T1 and a time period T2. The drive signal selecting circuit 200 switches whether to supply the drive signal COM as the drive signals VOUT to the ejectors 600 in the time period T1 and switches whether to supply the drive signal COM as the drive signals VOUT to the ejectors 600 in the time period T2. As a result, in the dot formation cycle T, ink ejected in the time period T1 and ink ejected in the time period T2 are mixed to form a single dot on the medium P.

As described above, the liquid ejecting head 21 can form dots of 4 different sizes on the medium P by using the change signal CH to divide the dot formation cycle T into the time periods T1 and T2 to switch individually whether to supply the drive signal COM as the drive signals VOUT to the ejectors 600 in the time period T1 and whether to supply the drive signal COM as the drive signals VOUT to the ejectors 600 in the time period T2. Therefore, the liquid ejecting head 21 can form a high-definition image on the medium P by forming dots of four gray levels. That is, the change signal CH defines the switching timing of the drive signal selecting circuit 200. Although the embodiment describes the case where the change signal CH divides the dot formation cycle T into the time periods T1 and T2, the change signal CH may divide the dot formation cycle T into three or more time periods based on a material of the medium to be used, a physical property of the ink, and a user's request.

The head control signal DI is synchronized with the clock signal SCK. The head control signal DI includes, in series, an ejection control signal SI defining each of amounts of the ink to be ejected by the nozzles 651 included in the number m of ejectors 600 onto the medium P, and a setting information signal SP defining relationships between the ejection control signal SI and logic levels of the selection signals S to be output in each of the time periods T1 and T2 defined by the change signal CH. The head control signal DI is supplied to the selection control circuit 210 in synchronization with the clock signal SCK in the dot formation cycle T before the rising of the latch signal LAT. The head control signal DI is held in a register included in the selection control circuit 210 in a state in which the head control signal DI is associated with the number m of ejectors 600. Then, the overall head control signal DI held in the register is latched at the time of the rising of the latch signal LAT, thereby defining the logic levels of the selection signals S in the dot formation cycle T defined to include the rising of the latch signal LAT.

The head control signal DI including the ejection control signal SI and the setting information signal SP is described in detail with reference to FIG. 7. FIG. 7 is a diagram illustrating an example of a data configuration of the head control signal DI. As illustrated in FIG. 7, the head control signal DI includes the ejection control signal SI and the setting information signal SP, and the ejection control signal SI includes upper ejection data SIH and lower ejection data SIL.

Specifically, the ejection control signal SI includes 2-bit data that corresponds to each of the number m of ejectors 600 and is upper ejection data SIH and lower ejection data SIL that are used to control the driving of the piezoelectric element 60 included in the ejector 600. That is, the ejection control signal SI is a serial signal of 2m bits. More specifically, the ejection control signal SI includes, in series, the upper ejection data SIH of m bits in the order of the upper ejection data SIH corresponding to the ejector 600[*m*], the upper ejection data SIH corresponding to the ejector 600[*m*−1], . . . , and the upper ejection data SIH corresponding to the ejector 600[1]. In addition, the ejection control signal SI includes, in series, the lower ejection data SIL of m bits after the upper ejection data SIH in the order of the lower ejection data SIL corresponding to the ejector 600[*m*], the lower ejection data SIL corresponding to the ejector 600[*m*−1], . . . , and the lower ejection data SIL corresponding to the ejector 600[1]. In the following description, the upper ejection data SIH corresponding to the ejector 600[*i*] may be referred to as upper ejection data SIHi, and the lower ejection data SIL corresponding to the ejector 600[*i*] may be referred to as lower ejection data SILi.

The ink in an amount defined by 2 bits of the upper ejection data SIHi and the lower ejection data SILi is ejected from the ejector 600[*i*]. That is, the ejection control signal SI controls the driving of the piezoelectric elements 60 included in the ejectors 600 to define amounts of the ink to be ejected from the nozzles 651. In the following description, the upper and lower ejection data SIH and SIL corresponding to the ejectors 600 may be referred to as ejection data [SIH, SIL], and the upper and lower ejection data SIHi and SILi corresponding to the ejector 600[*i*] may be referred to as ejection data [SIHi, SILi].

The setting information signal SP is a serial signal including data for defining a drive pattern of the piezoelectric elements 60. Specifically, the setting information signal SP is a signal of 8 bits in total and includes, in series, four types of setting information SP00 to SP03 and four types of setting information SP10 to SP13 in the order of the setting information SP13, SP12, SP11, SP10, SP03, SP02, SP01, and SP00. The setting information SP00 to SP03 indicates a drive pattern of the piezoelectric elements 60 that is determined by the ejection data [SIH, SIL] included in the ejection control signal SI in the time period TI defined by the change signal CH. The setting information SP10 to SP13 indicates a drive pattern of the piezoelectric elements 60 that is determined by the ejection data [SIH, SIL] included in the ejection control signal SI in the time period T2 defined by the change signal CH. That is, the setting information signal SP defines relationships between the ejection data [SIH, SIL] included in the ejection control signal SI and the logic levels of the selection signals S defining the state of the drive signal selecting circuit 200, specifically, states of the selecting circuits 230[1] to 230[*m*] in each of the time periods T1 and T2 defined by the change signal CH. Although the embodiment describes the case where the setting information signal SP is an 8-bit signal, the setting information signal SP may be a signal of 9 or more bits or 7 or less bits based on the number of time periods into which the dot formation cycle T is divided by the change signal CH.

As described above, the control circuit 100 outputs, to the selection control circuit 210, the latch signal LAT defining the dot formation cycle T, the change signal CH defining the timing of switching whether the drive signal selecting circuit 200 supplies the drive signal COM as the drive signals VOUT to the ejectors 600, the ejection control signal SI defining each of amounts of the ink to be ejected by the number m of nozzles 651 onto the medium P, the setting information signal SP defining the relationships between the ejection control signal SI and the logic levels of the selection signals S defining the states of the selecting circuits 230[1] to 230[*m*] in each of the time periods T1 and T2, and the clock signal SCK for the transmission of the head control signal DI including the ejection control signal SI and the setting information signal SP in series.

Returning to FIG. 5, the control logic circuit 260 includes an SP register group 261 and a selection control signal generator 262. The SP register group 261 includes a plurality of registers coupled to each other in series and constitutes a so-called shift register that transfers the head control signal DI input in synchronization with the clock signal SCK from the registers to the registers at the subsequent stages of the registers. When the supply of the clock signal SCK is stopped, the setting information SP00 to SP13 included in the setting information signal SP in the head control signal DI is held in the SP register group 261. The selection control signal generator 262 latches the setting information SP00 to SP13 held in the SP register group 261 at the time of the rising of the latch signal LAT, interprets the latched setting information SP00 to SP13 to generate a selection control signal Q1 including the setting information SP00, SP01, SP02, and SP03 and defining the logic levels of the selection signals S to be output from the selection control circuit 210 in the time period T1 and a selection control signal Q2 including the setting information SP10, SP11, SP12, and SP13 and defining the logic levels of the selection signals S to be output from the selection control circuit 210 in the time period T2, and outputs the selection control signals Q1 and Q2 to each of decoders 226 included in the number m of selection signal output units 270.

In the following description, the selection control signal Q1 including the setting information SP00, SP01, SP02, and SP03 may be referred to as selection control signal Q1[SP00, SP01, SP02, SP03], and the selection control signal Q2 including the setting information SP10, SP11, SP12, and SP13 may be referred to as selection control signal Q2[SP10, SP11, SP12, S13].

Each of the number m of selection signal output units 270 includes a first register 222*a*, a second register 222*b*, a first latch circuit 224*a*, a second latch circuit 224*b*, and the decoder 226.

The second registers 222*b* included in the number m of selection signal output units 270 are coupled in series to the SP register group 261 including the plurality of registers on the subsequent stage side of the SP register group 261, while the first registers 222*a* included in the number m of selection signal output units 270 are coupled in series to the number m of second registers 222*b* on the subsequent stage side of the second registers 222*b* coupled to each other in series. Specifically, the second register 222*b* included in the selection signal output unit 270 corresponding to the ejector 600[1] is coupled to the SP register group 261 on the subsequent stage side of the SP register group 261. In addition, the second register 222*b* included in the selection signal output unit 270 corresponding to the ejector 600[2], the second register 222*b* included in the selection signal output unit 270 corresponding to the ejector 600[3], . . . , and the second register 222*b* included in the selection signal output unit 270 corresponding to the ejector 600[*m*] are coupled in series to the second register 222*b* included in the selection signal output unit 270 corresponding to the ejector 600[1] on the subsequent stage side of the second register 222*b* included in the selection signal output unit 270 corresponding to the ejector 600[1]. The first register 222*a* included in the selection signal output unit 270 corresponding to the ejector 600[1] is coupled to the second register 222*b* included in the selection signal output unit 270 corresponding to the ejector 600[*m*] on the subsequent stage side of the second register 222*b* included in the selection signal output unit 270 corresponding to the ejector 600[*m*]. In addition, the first register 222*a* included in the selection signal output unit 270 corresponding to the ejector 600[2], the first register 222*a* included in the selection signal output unit 270 corresponding to the ejector 600[3], . . . , and the first register 222*a* included in the selection signal output unit 270 corresponding to the ejector 600[*m*] are coupled in series to the first register 222*a* included in the selection signal output unit 270 corresponding to the ejector 600[1] on the subsequent stage side of the first register 222*a* included in the selection signal output unit 270 corresponding to the ejector 600[1].

That is, the SP register group 261, the number m of second registers 222*b* included in the number m of selection signal output units 270, and the number m of first registers 222*a* included in the number m of selection signal output units 270 constitute the shift register. The head control signal DI input to the SP register group 261 is transferred toward the subsequent stage side in synchronization with the clock signal SCK in the order of the number m of second registers 222*b* included in the number m of the selection signal output units 270 and the number m of first registers 222*a* included in the number m of selection signal output units 270. After that, when the supply of the clock signal SCK is stopped, the lower ejection data SILi corresponding to the ejector 600[*i*] is held in the second register 222*b* included in the selection signal output unit 270 corresponding to the ejector 600[*i*], and the upper ejection data SIHi corresponding to the ejector 600[*i*] is held in the first register 222*a* included in the selection signal output unit 270 corresponding to the ejector 600[*i*].

The upper ejection data SIH held in the first registers 222*a* included in the number m of the selection signal output units 270 is latched by the corresponding first latch circuits 224*a* at the time of the rising of the latch signal LAT, and the lower ejection data SIL held in the second registers 222*b* included in the number m of the selection signal output units 270 is latched by the corresponding second latch circuits 224*b* at the time of the rising of the latch signal LAT. The first latch circuits 224*a* output the latched upper ejection data SIH as latched data LTa to the decoders 226, and the second latch circuits 224*b* output the latched lower ejection data SIL as latched data LTb to the decoders 226.

In the following description, the latched data LTa output by the first latch circuit 224*a* included in the selection signal output unit 270 corresponding to the ejector 600[*i*] may be referred to as latched data LTai, and the latched data LTb output by the second latch circuit 224*b* included in the selection signal output unit 270 corresponding to the ejector 600[*i*] may be referred to as latched data LTbi. In addition, the latched data LTa and LTb may be referred to as latched data [LTa, LTb], and the latched data [LTa, LTb] corresponding to the ejector 600[*i*] may be referred to as latched data [LTai, LTbi].

The selection control signal Q1[SP00, SP01, SP02, SP03] output by the selection control signal generator 262, the selection control signal Q2[SP10, SP11, SP12, SP13] output by the selection control signal generator 262, and the latched data [LTa, LTb] corresponding to the ejection data [SIH, SIL] are input to the decoders 226. The decoders 226 generate the selection signals S based on the selection control signals Q1 and Q2 and the latched data [LTa, LTb] and output the selection signals S to the corresponding selecting circuits 230.

FIG. 8 is a diagram illustrating details of decoding by each decoder 226. As illustrated in FIG. 8, the decoder 226 selects a logic level defined by the selection control signal Q1[SP00, SP01, SP02, SP03] and outputs the logic level as the selection signal S in the time period T1, and selects a logic level defined by the selection control signal Q2[SP10, SP11, SP12, SP13] and outputs the logic level as the selection signal S in the time period T2. That is, the change signal CH defining the time period T1 and the time period T2 defines the timing of switching whether the drive signal selecting circuit 200 switches whether to supply the drive signals COMA and COMB to the piezoelectric elements 60 based on the selection control signal Q1[SP00, SP01, SP02, SP03] or switches whether to supply the drive signals COMA and COMB to the piezoelectric elements 60 based on the selection control signal Q2[SP10, SP11, SP12, SP13].

Specifically, when the ejection data [SIH, SIL]=[1, 1] is input in the dot formation cycle T, the decoder 226 outputs the logic level of the setting information SP00 as the selection signal S in the time period T1 in accordance with the details defined in the selection control signals Q1 and Q2 and outputs the logic level of the setting information SP10 as the selection signal S in the time period T2 in accordance with the details defined in the selection control signals Q1 and Q2. Similarly, when the ejection data [SIH, SIL]=[1, 0] is input in the dot formation cycle T, the decoder 226 outputs the logic level of the setting information SPOT as the selection signal S in the time period T1 in accordance with the details defined in the selection control signals Q1 and Q2 and outputs the logic level of the setting information SP11 as the selection signal S in the time period T2 in the details defined in the selection control signals Q1 and Q2.

Furthermore, when the ejection data [SIH, SIL]=[0, 1] is input in the dot formation cycle T, the decoder 226 outputs the logic level of the setting information SP02 as the selection signal S in the time period T1 in accordance with the details defined in the selection control signals Q1 and Q2 and outputs the logic level of the setting information SP12 as the selection signal S in the time period T2 in the details defined in the selection control signals Q1 and Q2. When the ejection data [SIH, SIL]=[0, 0] is input in the dot formation cycle T, the decoder 226 outputs the logic level of the setting information SP03 as the selection signal S in the time period T1 in accordance with the details defined in the selection control signals Q1 and Q2 and outputs the logic level of the setting information SP13 as the selection signal S in the time period T2 in the details defined in the selection control signals Q1 and Q2.

As described above, the selection control circuits 210 output the selection signals S[1] to S[m] to control the states of the selecting circuits 230[1] to 230[*m*] corresponding to the ejectors 600[1] to 600[*m*] based on the clock signal SCK, the latch signal LAT, the change signals CH, and the head control signals DI. That is, in the drive signal selecting circuit 200, the selection control circuit 210*a* outputs the selection signals Sa[1] to Sa[m] to control the states of the selecting circuits 230[1] to 230[*m*] corresponding to the ejectors 600[1] to 600[*m*] based on the clock signal SCK, the latch signal LAT, the change signal CHA, and the head control signal DIA, and the selection control circuit 210*b* outputs the selection signals Sb[1] to Sb[m] to control the states of the selecting circuits 230[1] to 230[*m*] corresponding to the ejectors 600[1] to 600[*m*] based on the clock signal SCK, the latch signal LAT, the change signal CHB, and the head control signal DIB.

Next, configurations of the selecting circuits 230[1] to 230[*m*] are described. The selecting circuits 230[1] to 230 [*m*] have the same configuration. Therefore, when the selecting circuits 230[1] to 230[*m*] do not need to be distinguished, the selecting circuits 230[1] to 230[*m*] may be referred to as selecting circuits 230. In the following description, it is assumed that a selection signal Sa among the selection signals Sa[1] to Sa[m] and a selection signal Sb among the selection signals Sb[1] to Sb[m] are input to each of the selecting circuits 230.

Figure 9:
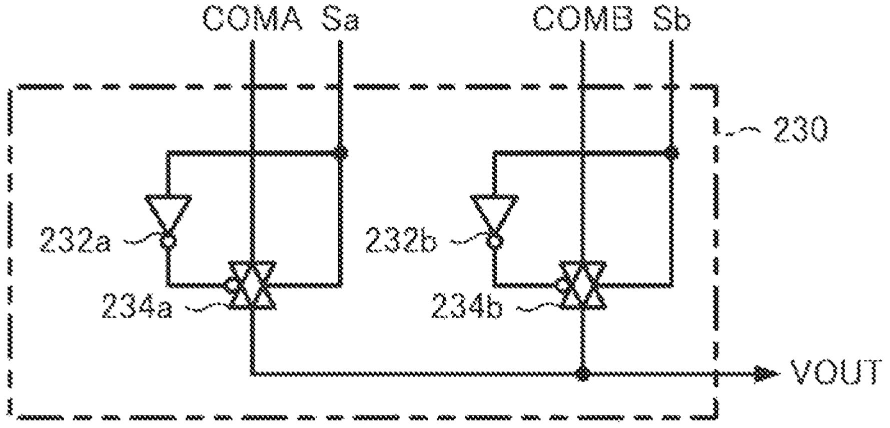
FIG. 9 is a diagram illustrating a configuration of a selecting circuit corresponding to one ejector.

FIG. 9 is a diagram illustrating the selecting circuit 230 corresponding to a single ejector 600. As illustrated in FIG. 9, the selecting circuit 230 includes inverters 232*a* and 232*b* and transfer gates 234*a* and 234*b*. The inverters 232*a* and 232*b* are NOT circuits.

The selection signal Sa output by the selection control circuit 210*a* is input to a positive control terminal of the transfer gate 234*a*, and is logically inverted by the inverter 232*a* and input to a negative control terminal of the transfer gate 234*a*. The positive control terminal is not indicated with a circle, and the negative control terminal is indicated with a circle. The drive signal COMA is supplied to an input terminal of the transfer gate 234*a*. Specifically, when the input selection signal Sa is at an H level, the transfer gate 234*a* is electrically conductive between the input terminal and an output terminal of the transfer gate 234*a*. When the input selection signal Sa is at an L level, the transfer gate 234*a* is not electrically conductive between the input terminal and the output terminal.

The selection signal Sb output by the selection control circuit 210*b* is input to a positive control terminal of the transfer gate 234*b*, and is logically inverted by the inverter 232*b* and input to a negative control terminal of the transfer gate 234*b*. The positive control terminal is not indicated with a circle, and the negative control terminal is indicated with a circle. The drive signal COMB is supplied to an input terminal of the transfer gate 234*b*. Specifically, when the input selection signal Sb is at an H level, the transfer gate 234*b* is electrically conductive between the input terminal and an output terminal of the transfer gate 234*b*. When the input selection signal Sb is at an L level, the transfer gate 234*b* is not electrically conductive between the input terminal and the output terminal.

The output terminal of the transfer gate 234*a* and the output terminal of the transfer gate 234*b* are commonly coupled to each other, and the drive signal VOUT is output from a coupling point where the output terminals are commonly coupled to each other.

As described above, the drive signal selecting circuit 200 according to the embodiment generates the drive signals VOUT[1] to VOUT[m] by selecting or unselecting the drive signals COMA and COMB based on the input clock signal SCK, the input latch signal LAT, the input change signals CHA and CHB, and the head control signals DIA and DIB, and outputs the drive signals VOUT[1] to VOUT[m] to the corresponding ejectors 600[*i*] to 600[*m*].

4. Control of Liquid Ejecting Head by Control Mechanism

As described above, the drive signal selecting circuit 200 according to the embodiment generates the drive signals VOUT[1] to VOUT[m] by selecting or unselecting the drive signals COMA and COMB based on the input clock signal SCK, the input latch signal LAT, the input change signals CHA and CHB, and the head control signals DIA and DIB, and outputs the drive signals VOUT[1] to VOUT[m] to the corresponding ejectors 600[*i*] to 600[*m*]. That is, the control mechanism 10 controls the drive signal selecting circuit 200 based on the clock signal SCK, the latch signal LAT, the change signals CHA and CHB, and the head control signals DIA and DIB to supply the drive signals VOUT[1] to VOUT[m] based on the drive signals COMA and COMB to the ejectors 600[1] to 600[*m*] and cause the ejectors 600[1] to 600[*m*] to eject the ink.

In addition, as illustrated in FIG. 2, the control mechanism 10 controls the storage circuit 250 included in the liquid ejecting head 21 based on the clock signal SCK, the latch signal LAT, the change signal CHA, and the head control signal DIA to store desired information to the storage circuit 250 and read information stored in the storage circuit 250. That is, the control mechanism 10 uses the clock signal SCK, the latch signal LAT, the change signals CHA and CHB, and the head control signals DIA and DIB to control the drive signal selecting circuit 200 included in the liquid ejecting head 21 and control the storage circuit 250 included in the liquid ejection head 21 as the control of the liquid ejecting head 21.

That is, in the liquid ejecting apparatus 1 according to the embodiment, the control mechanism 10 has an ejection control period for which the liquid ejecting head 21 is controlled so as to eject the ink from the nozzles 651, and a non-ejection control period for which the liquid ejecting head 21 is controlled so as not to eject the ink from the nozzles 651. The control mechanism 10 outputs the head control signal DIA including data that differs between the ejection control period and the non-ejection control period. Therefore, even when the control mechanism 10 uses the common signals, which are the clock signal SCK, the latch signal LAT, the change signals CHA and CHB, and the head control signals DIA and DIB, to control the drive signal selecting circuit 200 and the storage circuit 250 included in the liquid ejecting head 21, the possibility that an erroneous operation may be performed in the liquid ejecting apparatus 1 is reduced.

A specific example of operations of the control mechanism 10 and the liquid ejecting head 21 in each of the ejection control period and the non-ejection control period and the head control signals DIA and DIB that are output by the control mechanism 10 is described. The control of the liquid ejecting head 21 by the control mechanism 10 in the ejection control period is described in detail. Before the control of the liquid ejecting head 21 by the control mechanism 10 in the ejection control period is described in detail, an example of waveforms of the drive signals COMA and COMB output by the drive signal output circuit 51 to eject the ink from the nozzles 651 is described below. After the description, the control of the liquid ejecting head 21 in the ejection control period is described. In the following description, time periods T1 and T2 that are included in the dot formation cycle T defined by the latch signal LAT and are obtained by dividing the dot formation cycle T based on the change signal CHA may be referred to as time period Ta1 and time period Ta2, respectively, and time periods T1 and T2 that are included in the dot formation cycle T defined by the latch signal LAT and are obtained by dividing the dot formation cycle T based on the change signal CHB may be referred to as time period Tb1 and time period Tb2, respectively.

Figure 10:
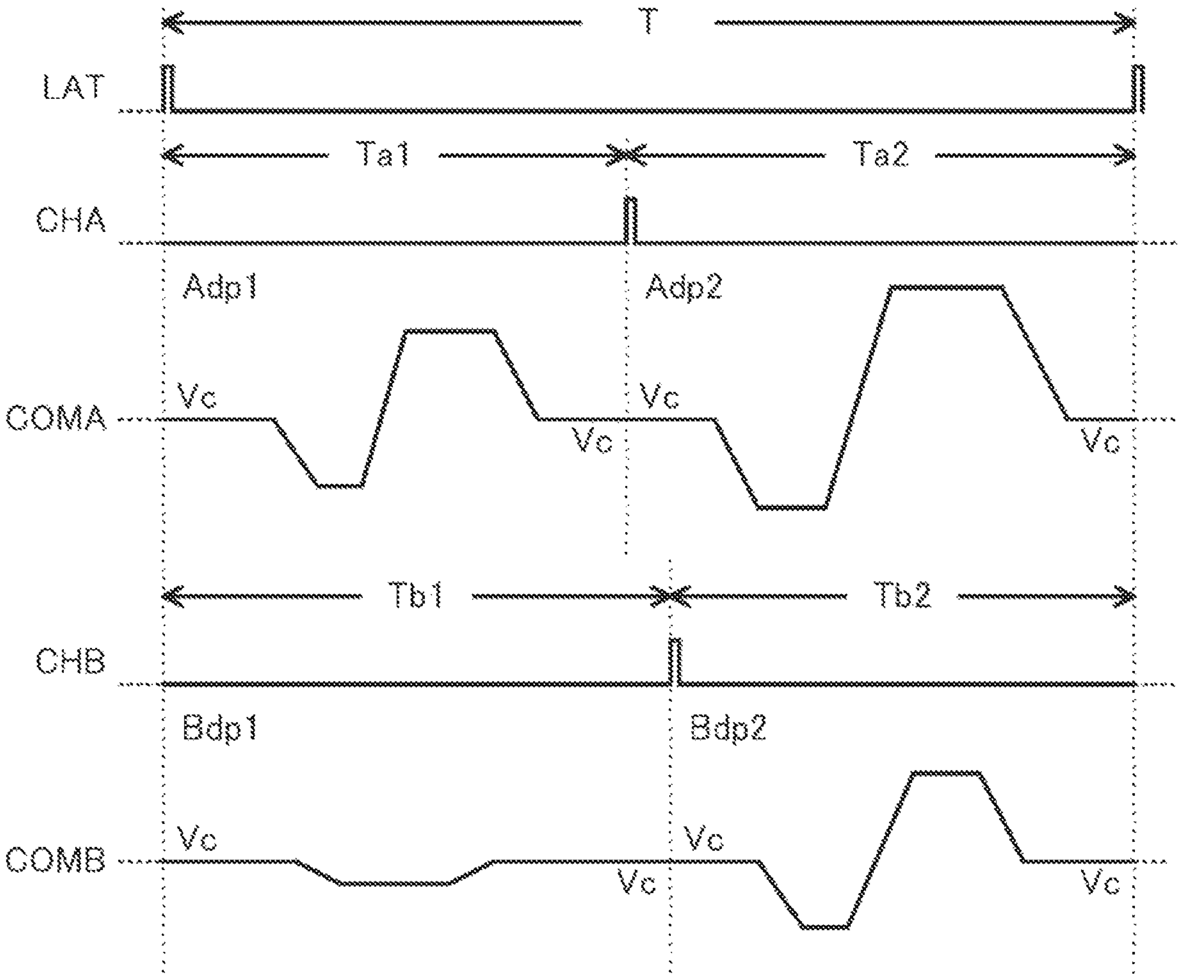
FIG. 10 is a diagram illustrating an example of waveforms of drive signals.

FIG. 10 is a diagram illustrating an example of the waveforms of the drive signals COMA and COMB. As illustrated in FIG. 10, the drive signal COMA has a waveform in which a trapezoidal waveform Adp1 for the time period Ta1 from the rising of the latch signal LAT to the rising of the change signal CHA is continuous with a trapezoidal waveform Adp2 for the time period Ta2 from the rising of the change signal CHA to the next rising of the latch signal LAT. The trapezoidal waveform Adp1 causes a small amount of ink to be ejected from each of the nozzles 651 and the trapezoidal waveform Adp2 causes a medium amount of ink to be ejected from each of the nozzles 651. The medium amount is larger than the small amount.

In addition, the drive signal COMB has a waveform in which a trapezoidal waveform Bdp1 for the time period Tb1 from the rising of the latch signal LAT to the rising of the change signal CHB is continuous with a trapezoidal waveform Bdp2 for the time period Tb2 from the rising of the change signal CHB to the next rising of the latch signal LAT. The trapezoidal waveform Bdp1 does not cause ink to be ejected from the nozzles 651 and causes ink in the vicinity of openings of the nozzles 651 to slightly vibrate to prevent an increase in the viscosity of the ink. The trapezoidal waveform Bdp2 causes a small amount of ink to be ejected from each of the nozzles 651 in the same manner as the trapezoidal waveform Adp1.

As illustrated in FIG. 10, voltages at start and end times of the trapezoidal waveforms Adp1, Adp2, Bdp1, and Bdp2 are commonly a voltage Vc. That is, each of the trapezoidal waveforms Adp1, Adp2, Bdp1, and Bdp2 starts at the voltage Vc and ends at the voltage Vc.

Although FIG. 10 illustrates that the trapezoidal waveform Adp1 is the same as the trapezoidal waveform Bdp2, the trapezoidal waveform Adp1 may be different from the trapezoidal waveform Bdp2. When the trapezoidal waveform Adp1 is supplied to an ejector 600, the small amount of ink is ejected from a nozzle 651 corresponding to the ejector 600. In addition, when the trapezoidal waveform Bdp2 is supplied to the ejector 600, the small amount of ink is ejected from the nozzle 651 corresponding to the ejector 600. However, the amount of the ink to be ejected from the nozzle 651 when the trapezoidal waveform Adp1 is supplied to the ejector 600 may be different from the amount of the ink to be ejected from the nozzle 651 when the trapezoidal waveform Bdp2 is supplied to the ejector 600. That is, the waveforms of the drive signals COMA and COMB are not limited to the waveforms illustrated in FIG. 10 and may have a combination of various waveforms based on the movement speed of the carriage 20 with the liquid ejecting head 21 mounted thereon, a characteristic of the ink supplied to the liquid ejecting head 21, the material of the medium P, and the like.

Next, an operation in the case where the control mechanism 10 controls the liquid ejecting head 21 in the ejection control period is described. FIG. 11 is a diagram illustrating an example of the head control signals DIA and DIB output by the control mechanism 10 in the ejection control period. As described above, the ejection control signal SI included in each of the head control signals DIA and DIB defines the amount of the ink to be ejected from each of the number m of nozzles 651 and has a logic level that changes in the ejection control period as appropriate. That is, the ejection data [SIH, SIL] included in the ejection control signal SI is 0 or 1 based on the amount of the ink to be ejected from each of the corresponding nozzles 651 in the dot formation cycle T. Therefore, in FIG. 11, the ejection data [SIH, SIL] indicating 0 or 1 is indicated as "0/1". In the following description, "1" indicates an H-level signal and "0" indicates an L-level signal.

As illustrated in FIG. 11, in the ejection control period, the control mechanism 10 outputs, to the selection control circuit 210*a*, the head control signal DIA including the setting information signal SP in which the setting information SP00, SP01, SP02, SP03, SP10, SP11, SP12, and SP13 is "1", "1", "0", "0", "1", "0", "0", and "0", respectively. Therefore, the selection control signal generator 262 included in the control logic circuit 260 of the selection control circuit 210*a* generates the selection control signal Q1[SP00, SP01, SP02, SP03]=[1, 1, 0, 0] and the selection control signal Q2[SP10, SP11, SP12, SP13]=[1, 0, 0, 0] based on the setting information signal SP and outputs the selection control signal Q1[SP00, SP01, SP02, SP03]=[1, 1, 0, 0] and the selection control signal Q2[SP10, SP11, SP12, SP13]=[1, 0, 0, 0] to the decoders 226.

FIG. 12 is a diagram illustrating details of decoding by each decoder 226 included in the selection control circuit 210*a* in the ejection control period. As illustrated in FIG. 12, when the ejection data [SIH, SIL]=[1, 1] is input, the decoder 226 outputs the selection signal Sa that is at an H level for the time periods T1 and T2. When the ejection data [SIH, SIL]=[1, 0] is input, the decoder 226 outputs the selection signal Sa that is at an H level for the time period T1 and at an L level for the time period T2. When the ejection data [SIH, SIL]=[0, 1] is input, the decoder 226 outputs the selection signal Sa that is at an L level for the time periods T1 and T2. When the ejection data [SIH, SIL]=[0, 0] is input, the decoder 226 outputs the selection signal Sa that is at an L level for the time periods T1 and T2.

Returning to FIG. 11, in the ejection control period, the control mechanism 10 outputs, to the selection control circuit 210*b*, the head control signal DIB including the setting information signal SP in which the setting information SP00, SP01, SP02, SP03, SP10, SP11, SP12, and SP13 is "0", "0", "0", "1", "0", "1", "1", and "0", respectively. Therefore, the selection control signal generator 262 included in the control logic circuit 260 of the selection control circuit 210*b* generates the selection control signal Q1[SP00, SP01, SP02, SP03]=[0, 0, 0, 1] and the selection control signal Q2[SP10, SP11, SP12, SP13]=[0, 1, 1, 0] based on the setting information signal SP and outputs the selection control signal Q1[SP00, SP01, SP02, SP03]=[0, 0, 0, 1] and the selection control signal Q2[SP10, SP11, SP12, SP13]=[0, 1, 1, 0] to the decoders 226.

FIG. 13 is a diagram illustrating details of decoding by each decoder 226 included in the selection control circuit 210*b* in the ejection control period. As illustrated in FIG. 13, when the ejection data [SIH, SIL]=[1, 1] is input, the decoder 226 outputs the selection signal Sb that is at an L level for the time periods T1 and T2. When the ejection data [SIH, SIL]=[1, 0] is input, the decoder 226 outputs the selection signal Sb that is at an L level for the time period T1 and at an H level for the time period T2. When the ejection data [SIH, SIL]=[0, 1] is input, the decoder 226 outputs the selection signal Sb that is at an L level for the time period T1 and at an H level for the time period T2. When the ejection data [SIH, SIL]=[0, 0] is input, the decoder 226 outputs the selection signal Sb that is at an H level for the time period T1 and at an L level for the time period T2.

Figure 14:
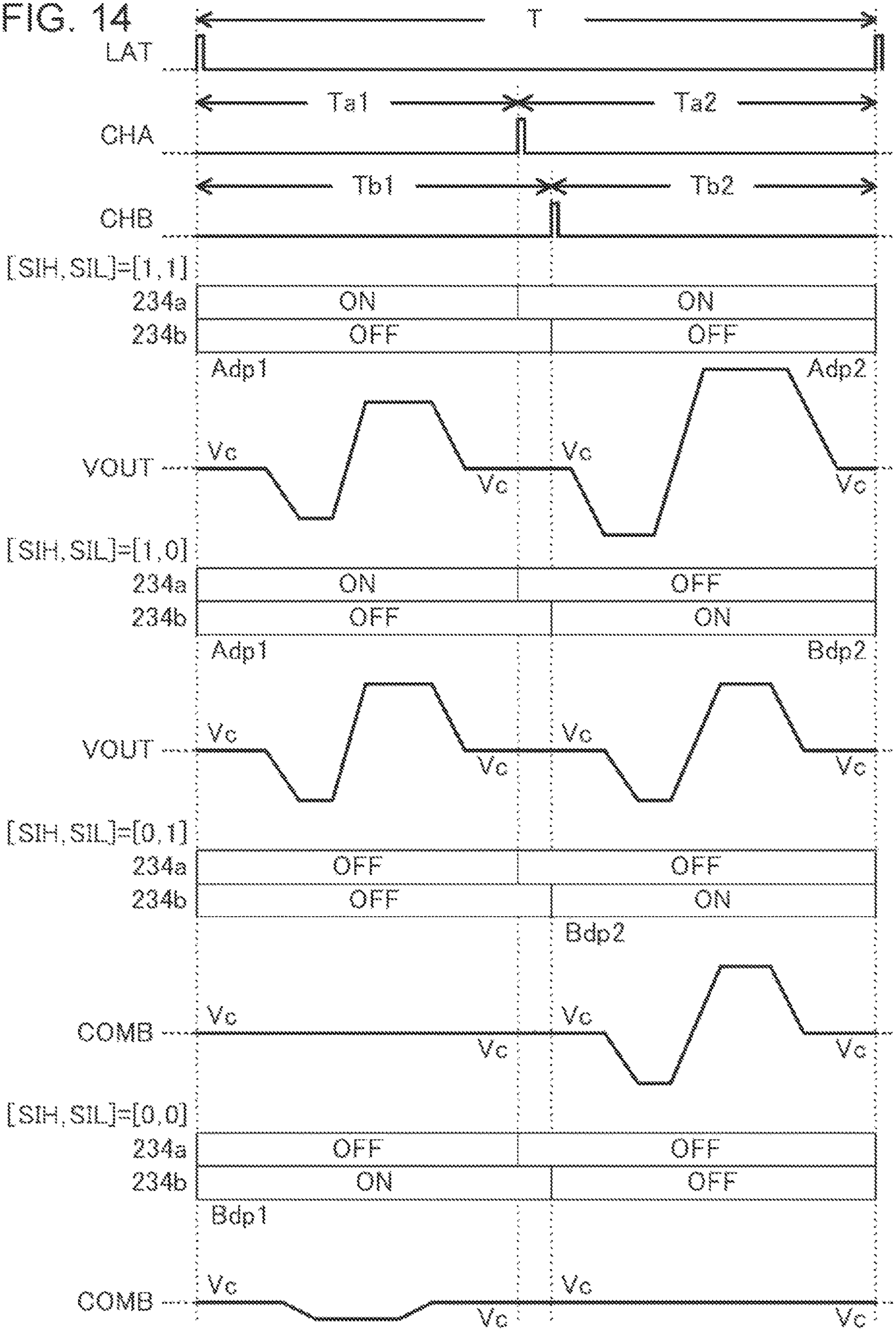
FIG. 14 is a diagram describing an operation of a selecting circuit when selection signals illustrated in FIGS. 12 and 13 are supplied.

FIG. 14 is a diagram describing an operation of the selecting circuit 230 when the selection signals Sa and Sb illustrated in FIGS. 12 and 13 are supplied. As illustrated in FIG. 14, when the ejection data [SIH, SIL]=[1, 1], the H-level selection signal Sa is supplied to the transfer gate 234*a* for the time periods Ta1 and Ta2, and the L-level selection signal Sb is continuously supplied to the transfer gate 234*b* for the dot formation cycle T. Therefore, for the dot formation cycle T, the drive signal VOUT in which the trapezoidal waveform Adp1 is continuous with the trapezoidal waveform Adp2 is supplied to a corresponding piezoelectric element 60. As a result, the small amount of ink and the medium amount of ink are ejected from the nozzle 651 and land on the medium P. After that, the small amount of ink that landed on the medium P and the medium amount of ink that landed on the medium P are mixed to form a large dot on the medium P.

When the ejection data [SIH, SIL]=[1, 0], the H-level selection signal Sa is supplied to the transfer gate 234*a* for the time period Ta1, the L-level selection signal Sa is supplied to the transfer gate 234*a* for the time period Ta2, the L-level selection signal Sb is supplied to the transfer gate 234*b* for the time period Tb1, and the H-level selection signal Sb is supplied to the transfer gate 234*b* for the time period Tb2. Therefore, for the dot formation cycle T, the drive signal VOUT in which the trapezoidal waveform Adp1 is continuous with the trapezoidal waveform Bdp2 is supplied to the corresponding piezoelectric element 60. As a result, the small amount of ink is ejected from the nozzle 651 twice and lands on the medium P. After that, the small amount of ink that landed on the medium P and the small amount of ink that landed on the medium P are mixed to form a medium dot on the medium P.

When the ejection data [SIH, SIL]=[0, 1], the L-level selection signal Sa is continuously supplied to the transfer gate 234*a* for the dot formation cycle T, the L-level selection signal Sb is supplied to the transfer gate 234*b* for the time period Tb1, and the H-level selection signal Sb is supplied to the transfer gate 234*b* for the time period Tb2. Therefore, for the dot formation cycle T, the drive signal VOUT in which a constant waveform at the voltage Vc is continuous with the trapezoidal waveform Bdp2 is supplied to the corresponding piezoelectric element 60. As a result, the small amount of ink is ejected from the nozzle 651 once and lands on the medium P to form a small dot on the medium P.

When the ejection data [SIH, SIL]=[0, 0], the L-level selection signal Sa is continuously supplied to the transfer gate 234*a* for the dot formation cycle T, the H-level selection signal Sb is supplied to the transfer gate 234*b* for the time period Tb1, and the L-level selection signal Sb is supplied to the transfer gate 234*b* for the time period Tb2. Therefore, for the dot formation cycle T, the drive signal VOUT in which the trapezoidal Bdp1 is continuous with a constant waveform at the voltage Vc is supplied to the corresponding piezoelectric element 60. In this case, only a portion present in the vicinity of the nozzle 651 slightly vibrates and the ink is not ejected from the nozzle 651. Therefore, a dot is not formed on the medium P.

As described above, in the ejection control period, the control mechanism 10 outputs the head control signals DIA and DIB to the liquid ejecting head 21 as illustrated in FIG. 11, and the liquid ejecting head 21 forms three types of dots, a large dot, a medium dot, and a small dot on the medium P, based on the ejection control signal SI and the setting information signal SP.

Next, an operation in the case where the control mechanism 10 controls the liquid ejecting head 21 and acquires information stored in the storage circuit 250 is described.

Figure 15:
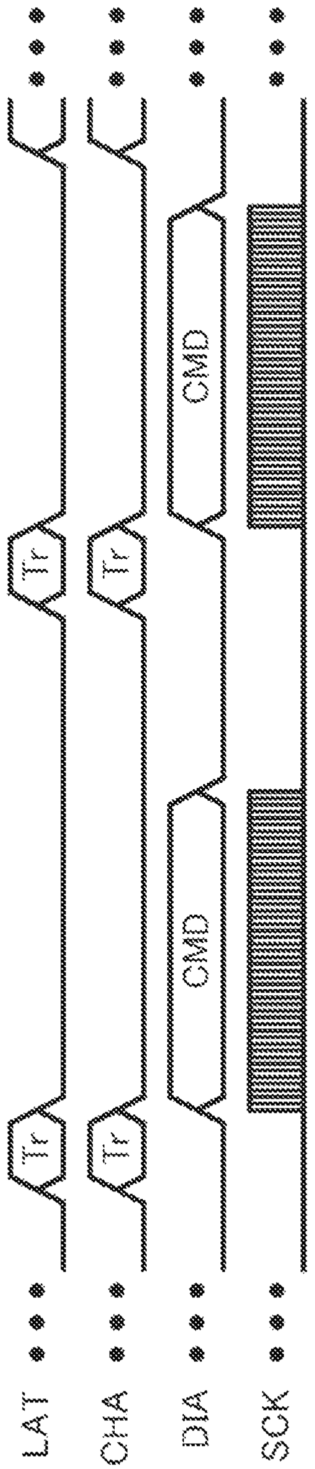
FIG. 15 is a diagram illustrating an example of an operation in the case where the control mechanism acquires information stored in a storage circuit.

FIG. 15 is a diagram illustrating an example of the operation in the case where the control mechanism 10 acquires information stored in the storage circuit 250. First, the control mechanism 10 generates a trigger signal Tr for setting the logic level of the latch signal LAT and the logic level of the change signal CHA to predetermined logic levels and outputs the trigger signal Tr to the storage circuit 250. Therefore, the storage circuit 250 enters into an accessible state in which information held in the storage circuit 250 is readable and predetermined information is writable to the storage circuit 250. The trigger signal Tr preferably sets the logic level of the latch signal LAT and the logic level of the change signal CHA to logic levels including logic levels that are not set in the ejection control period. For example, in the embodiment, the trigger signal Tr includes a state in which each of the logic levels of the latch signal LAT and the change signal CHA is an H level.

After the storage circuit 250 enters into the accessible state based on the trigger signal Tr, the control mechanism 10 outputs, to the storage circuit 250, the head control signal DIA including a command signal CMD to acquire information held in the storage circuit 250 or write predetermined information to the storage circuit 250, in synchronization with the clock signal SCK. Therefore, the information corresponding to the command signal CMD is stored to the storage circuit 250 or the information corresponding to the command signal CMD is read as the read information MI.

In the non-ejection control period, the head control signal DIA output by the control mechanism 10 and including the command signal CMD is also supplied to the drive signal selecting circuit 200. As a result, a signal corresponding to the command signal CMD is held in the number m of first registers 222*a*, the number m of second registers 222*b*, and the SP register group 261 that are included in the drive signal selecting circuit 200. As described above, the control mechanism 10 sets the storage circuit 250 to the accessible state using the trigger signal Tr that sets the logical levels of the latch signal LAT and the change signal CHA to the predetermined logic levels. Therefore, at the time of the rising of the change signal CHA or at the time of rising of the latch signal LAT, information held in the number m of first registers 222*a*, the number m of second registers 222*b*, and the SP register group 261 may be collectively latched and input to the decoders 226. As a result, the selection control circuit 210*a* may output an unintended selection signal Sa to the selecting circuits 230. As a result, the selecting circuits 230 may supply an unintended voltage as the drive signals VOUT to the piezoelectric elements 60. That is, the unintended voltage may be supplied to the piezoelectric elements 60.

In the non-ejection control period, when the unintended voltage is supplied to the piezoelectric elements 60, the piezoelectric elements 60 may be displaced in an unintended manner, and as a result, the liquid ejecting head 21 may erroneously eject the ink. In addition, when the unintended voltage is continuously supplied to the piezoelectric elements 60, an abnormality may occur in the piezoelectric elements 60, and as a result, the accuracy of ejecting the ink from the liquid ejecting head 21 may decrease. That is, an erroneous operation may be performed in the liquid ejecting apparatus 1.

To avoid such problems, the configurations of the head control signals DIA and DIB that are output by the control mechanism 10 in the non-ejection control period have been devised for the liquid ejecting apparatus 1 according to the embodiment, and thus the control mechanism 10 reduces the possibility that the configuration of the liquid ejecting apparatus 1 may become complex, the possibility that it may become difficult to downsize the liquid ejecting apparatus 1, and the possibility that an unintended voltage may be supplied to the piezoelectric elements 60 in the non-ejection control period.

FIG. 16 is a diagram illustrating an example of the head control signals DIA and DIB output by the control mechanism 10 in the non-ejection control period. As illustrated in FIG. 16, the control mechanism 10 generates the head control signals DIA and DIB each having a pseudo setting information signal DSP added thereto in series after the command signal CMD of p bits and outputs the head control signals DIA and DIB to the liquid ejecting head 21.

The pseudo setting information signal DSP includes pseudo setting information dq00 to dq13 having the same number of bits as that of the setting information signal SP included in each of the head control signals DIA and DIB output by the control mechanism 10 in the ejection control period. That is, the pseudo setting information dq00, dq01, dq02, dq03, dq10, dq11, dq12, and dq13 included in the pseudo setting information signal DSP corresponds to the setting information SP00, SP01, SP02, SP03, SP10, SP11, SP12, and SP13 included in the setting information signal SP, respectively. Therefore, in the non-ejection control period, when the supply of the clock signal SCK for the transmission of the head control signals DIA and DIB is stopped, the pseudo setting information dq00, dq01, dq02, dq03, dq10, dq11, dq12, and dq13 is held in each of the SP register groups 261 included in the selection control circuits 210*a* and 210*b*.

After that, when the latch signal LAT rises, each of the selection control signal generators 262 collectively latches and interprets the pseudo setting information dq00, dq01, dq02, dq03, dq10, dq11, dq12, and dq13 to generate a pseudo selection control signal DQ1[dq00, dq01, dq02, dq03] corresponding to the selection control signal Q1 and a pseudo selection control signal DQ2[dq10, dq11, dq12, dq13] corresponding to the selection control signal Q2, and outputs the pseudo selection control signals DQ1 and DQ2 to the decoders 226. That is, the control mechanism 10 outputs the head control signals DIA and DIB each having the pseudo setting information signal DSP added thereto in series after the command signal CMD of p bits in the non-ejection control period, thereby enabling the state of the drive signal selecting circuit 200 to be defined in each of the time periods Ta1, Ta2, Tb1, and Tb2 defined by the change signals CHA and CHB in the non-ejection control period.

Therefore, in the non-ejection control period, even when the control circuit 100 outputs the head control signals DIA and DIB each including the command signal CMD of p bits to control the storage circuit 250, the possibility that the state of the drive signal selecting circuit 200 may not be fixed is reduced, and as a result, the possibility that an unintended voltage may be supplied to the piezoelectric elements 60 is reduced.

As illustrated in FIG. 16, the head control signal DIA for the non-ejection control period includes the pseudo setting information [dq00, dq01, dq02, dq03, dq10, dq11, dq12, dq13]=[1, 1, 1, 1, 1, 1, 1, 1]. Therefore, the pseudo selection control signal DQ1 output based on the head control signal DIA is a pseudo selection control signal DQ1[dq00, dq01, dq02, dq03]=[1, 1, 1, 1]. The pseudo selection control signal DQ2 output based on the head control signal DIA is a pseudo selection control signal DQ2[dq10, dq11, dq12, dq13]=[1, 1, 1, 1]. That is, in the non-ejection control period, the pseudo selection control signal DQ1 and the pseudo selection control signal DQ2 are included in the same pseudo setting information signal DSP, and the control circuit 100 outputs the pseudo selection control signals DQ1 and DQ2 that include the pseudo setting information dq00, dq01, dq02, dq03, dq10, dq11, dq12, and dq13 and in which the logic levels of the pseudo setting information dq00, dq01, dq02, dq03, dq10, dq11, dq12, and dq13 are all the same.

FIG. 17 is a diagram illustrating details of decoding by each decoder 226 included in the selection control circuit 210*a* in the non-ejection control period. As illustrated in FIG. 17, in the non-ejection control period, each of the decoders 226 included in the selection control circuit 210*a* outputs the H-level selection signal Sa for the time periods T1 and T2, regardless of the logic levels of the ejection data [SIH, SIL]. That is, in the liquid ejecting apparatus 1 according to the embodiment, the selection control circuit 210*a* outputs the H-level selection signal Sa, regardless of the time periods Ta1 and Ta2 defined by the change signal CHA and the logic levels of the latched data [LTa, LTb].

Returning to FIG. 16, the head control signal DIB for the non-ejection control period includes pseudo setting information [dq00, dq01, dq02, dq03, dq10, dq11, dq12, dq13]=[0, 0, 0, 0, 0, 0, 0, 0]. Therefore, the pseudo selection control signal DQ1 output based on the head control signal DIB is the pseudo selection control signal DQ1[dq00, dq01, dq02, dq03]=[0, 0, 0, 0], and the pseudo selection control signal DQ2 output based on the head control signal DIB is the pseudo selection control signal DQ2[dq10, dq11, dq12, dq13]=[0, 0, 0, 0]. That is, in the non-ejection control period, the pseudo selection control signal DQ1 and the pseudo selection control signal DQ2 are included in the same pseudo setting information signal DSP, and the control circuit 100 outputs the pseudo selection control signals DQ1 and DQ2 that include the pseudo setting information dq00, dq01, dq02, dq03, dq10, dq11, dq12, and dq13 and in which the logic levels of the pseudo setting information dq00, dq01, dq02, dq03, dq10, dq11, dq12, and dq13 are all the same.

FIG. 18 is a diagram illustrating details of decoding by each decoder 226 included in the selection control circuit 210*b* in the non-ejection control period. As illustrated in FIG. 18, in the non-ejection control period, each of the decoders 226 included in the selection control circuit 210*b* outputs the L-level selection signal Sb for the time periods T1 and T2, regardless of the logic levels of the ejection data [SIH, SIL]. That is, in the liquid ejecting apparatus 1 according to the embodiment, the selection control circuit 210*b* outputs the L-level selection signal Sb, regardless of the time periods Tb1 and Tb2 defined by the change signal CHB and the logic levels of the latched data [LTa, LTb].

As described above, in the non-ejection control period, the pseudo selection control signal DQ1 and the pseudo selection control signal DQ2 are included in the same pseudo setting information signal DSP, and the control circuit 100 outputs the pseudo selection control signals DQ1 and DQ2 that include the pseudo setting information dq00, dq01, dq02, dq03, dq10, dq11, dq12, and dq13 and in which the logic levels of the pseudo setting information dq00, dq01, dq02, dq03, dq10, dq11, dq12, and dq13 are all the same, thereby enabling the state of the drive signal selection circuit 200 to be defined, regardless of the time periods Ta1, Ta2, Tb1, and Tb2 defined by the change signals CHA and CHB and the logical levels of the latched data [LTa, LTb]. That is, even in the non-ejection control period, it is possible to identify the state of the drive signal selection circuit 200 and as a result, the possibility that an unintended voltage may be supplied to the piezoelectric elements 60 is reduced. That is, even when the storage circuit 250 included in the liquid ejecting head 21 is controlled using the head control signals DIA and DIB to control the ejection of the ink from the liquid ejecting head 21 in the ejection control period, the possibility that an unintended voltage may be applied to the piezoelectric elements 60 included in the liquid ejecting head 21 is reduced and as a result, the possibility that an erroneous operation may be performed in the liquid ejecting head 21 is reduced.

As described above, in the embodiment, all the logic levels of the pseudo setting information dq00 to dq13 of the pseudo setting information signal DSP included in the head control signal DIA input in the non-ejection control period are preferably the same, and all the logic levels of the pseudo setting information dq00 to dq13 of the pseudo setting information signal DSP included in the head control signal DIB input in the non-ejection control period are preferably the same. However, it is sufficient if the logic levels of the setting information SP00 to SP13 of the setting information signal SP included in each of the head control signals DIA and DIB input in the ejection control period are different from the logic levels of the pseudo setting information dq00 to dq13 of the pseudo setting information signal DSP included in each of the head control signals DIA and DIB input in the non-ejection control period.

Since the logic levels of the setting information SP00 to SP13 are different from the logic levels of the pseudo setting information dq00 to dq13, the selection control signal generators 262 can determine that the held information does not request the switching of the drive signal selecting circuit 200. Therefore, when the pseudo setting information dq00 to dq13 having the logic levels different from the logic levels of the setting information SP00 to SP13 is input, the input pseudo setting information dq00 to dq13 can be interpreted to be the pseudo selection control signals DQ1 and DQ2 that do not switch the states of the selection signals Sa and Sb. That is, since at least the logic levels of the setting information SP00 to SP13 of the setting information signal SP included in each of the head control signals DIA and DIB input in the ejection control period are different from the logic levels of the pseudo setting information dq00 to dq13 of the pseudo setting information signal DSP included in each of the head control signals DIA and DIB input in the non-ejection control period, the possibility that an unintended voltage may be applied to the piezoelectric elements 60 included in the liquid ejecting head 21 is reduced, and as a result, the possibility that an erroneous operation may be performed in the liquid ejecting head 21 can be reduced.

In the embodiment, the control of the storage circuit 250 is exemplified as the control of the liquid ejecting head 21 by the control mechanism 10 during the non-ejection control period, but the control of the liquid ejecting head 21 by the control mechanism 10 during the non-ejection control period is not limited thereto. For example, even when a diagnosing circuit that diagnoses whether the liquid ejecting head 21 can normally operate is provided and controlled based on the head control signals DIA and DIB, the same effects are obtained.

The ejection control period is an example of a first time period and the non-ejection control period is an example of a second time period. The change signal CHA is an example of a switching timing signal. The change signal CHA defines the switching timing that is the switching timing of the selecting circuits 230 included in the drive signal selecting circuit 200 and includes the timing of switching the logic levels of the selection signals Sa from the logic levels defined by the selection control signal Q1 to the logic levels defined by the selection control signal Q2 in the ejection control period and the timing of switching the logic levels from the logic levels defined by the pseudo selection control signal DQ1 to the logic levels defined by the pseudo selection control signal DQ2 in the non-ejection control period. The setting information signal SP and the pseudo setting information signal DSP are an example of a state selection signal. The setting information signal SP defines the state of the drive signal selecting circuit 200 in the time periods Ta1 and Ta2 defined by the change signal CHA. The time periods Ta1 and Ta2 are an example of a control period.

The setting information SP00 to SP03 that is 4-bit data included in the selection control signal Q1 in the setting information signal SP, and the pseudo setting information dq00 to dq03 that is 4-bit data included in the pseudo selection control signal DQ1 in the pseudo setting information signal DSP are an example of n-bit first data. The setting information SP10 to SP13 that is 4-bit data included in the selection control signal Q2 in the setting information signal SP, and the pseudo setting information dq10 to dq13 that is 4-bit data included in the pseudo selection control signal DQ2 in the pseudo setting information signal DSP are an example of n-bit second data.

The number of bits included in each of the selection control signals Q1 and Q2 in the setting information signal SP, and the number of bits included in each of the pseudo selection control signal DQ1 and DQ2 in the pseudo setting information signal DSP are not limited to 4 and may be 5 or more based on the number of time periods obtained by dividing the dot formation cycle T by the change signals CHA and CHB and the number of types of sizes of dots to be formed on the medium.

5. Effects

As described above, in the ejection control period for which the control mechanism 10 included in the liquid ejecting apparatus 1 according to the embodiment controls the liquid ejecting head 21 so as to eject the ink from the nozzles 651, the control mechanism 10 outputs the setting information signal SP defining the state of the drive signal selecting circuit 200 in the time periods Ta1 and Ta2 defined by the change signal CHA. In the non-ejection control period for which the control mechanism 10 controls the liquid ejecting head 21 so as not to eject the ink from the nozzles 651, the control mechanism 10 outputs the pseudo setting information signal DSP defining the state of the drive signal selecting circuit 200 in the time periods Ta1 and Ta2 defined by the change signal CHA. In this case, since the setting information signal SP includes data different from that included in the pseudo setting information signal DSP, when the pseudo setting information signal DSP is supplied to the drive signal selecting circuit 200, the operation of the drive signal selecting circuit 200 can be fixed. Therefore, in the non-ejection control period for which the control mechanism 10 controls the liquid ejecting head 21 so as not to eject the ink from the nozzles 651, the operation of the drive signal selecting circuit 200 included in the liquid ejecting head 21 is not fixed and as a result, the possibility that an unintended voltage may be applied to the piezoelectric elements 60 is reduced. That is, it is possible to reduce the possibility that an erroneous operation may be performed in the liquid ejecting apparatus 1 having the control mechanism 10 according to the embodiment.

In the liquid ejecting apparatus 1 according to the embodiment, since the logic levels of the pseudo selection control signal DQ1 included in the pseudo setting information signal DSP defining the state of the drive signal selecting circuit 200 in the time period Ta1 defined by the change signal CHA are the same as the logic levels of the pseudo selection control signal DQ2 included in the pseudo setting information signal DSP defining the state of the drive signal selecting circuit 200 in the time period Ta2 defined by the change signal CHA, even when a new time period based on the change signal CHA is defined to be in the non-ejection control period, the operational state of the drive signal selecting circuit 200 included in the liquid ejecting head 21 can be fixed. Therefore, the simple configuration reduces the possibility that an unintended voltage may be applied to the piezoelectric elements 60. That is, it is possible to reduce the possibility that an erroneous operation may be performed in the liquid ejecting apparatus 1 having the control mechanism 10 according to the embodiment.

In the liquid ejecting apparatus 1 according to the embodiment, since all the logic levels of the pseudo selection control signal DQ1 included in the pseudo setting information signal DSP defining the state of the drive signal selecting circuit 200 in the time period Ta1 defined by the change signal CHA are the same, the operational state of the drive signal selecting circuit 200 included in the liquid ejecting head 21 can be fixed, regardless of the signals input to the drive signal selecting circuit 200 in the non-ejection control period. Therefore, the simple configuration further reduces the possibility that an unintended voltage may be applied to the piezoelectric elements 60. That is, it is possible to further reduce the possibility that an erroneous operation may be performed in the liquid ejecting apparatus 1 having the control mechanism 10 according to the embodiment.

although the embodiment and the modifications are described above, the present disclosure is not limited to the embodiment and the modifications and may be implemented in various forms without departing form the gist of the present disclosure. For example, the embodiment and the modifications may be combined as appropriate.

The present disclosure includes configurations (for example, configurations having the same functions, methods, and results as those of the configurations described in the embodiment, or configurations whose purposes and effects are the same as those of the configurations described in the embodiment) that are substantially the same as the configurations described in the embodiment. In addition, the present disclosure includes a configuration obtained by replacing a portion that is included in the configurations described in the embodiment and is not essential with another portion. Furthermore, the present disclosure includes configurations that have the same effects as those obtained by the configurations described in the embodiment or includes configurations that achieve the same purposes as those achieved by the configurations described in the embodiment. The present disclosure includes configurations obtained by adding a known technique to the configurations described in the embodiment.

The following features are obtained from the foregoing embodiment and the foregoing modifications.

A liquid ejecting head control circuit according to an aspect controls a liquid ejecting head that includes a drive element that is driven based on a drive signal to cause a liquid to be ejected from a nozzle, and a switching circuit that switches whether to supply the drive signal to the drive element. The liquid ejecting head control circuit includes a drive signal output circuit that outputs the drive signal, and a switching control circuit that controls the switching circuit. The switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal. The state selection signal for a first time period for which the liquid ejecting liquid is controlled so as to eject the liquid from the nozzle is different from the state selection signal for a second time period for which the liquid ejecting liquid is controlled so as not to eject the liquid from the nozzle.

According to this liquid ejecting head control circuit, since the state selection signal for the first time period for which the liquid ejecting head is controlled so as to eject the liquid from the nozzle is different from the state selection signal for the second time period for which the liquid ejecting head is controlled so as not to eject the liquid from the nozzle, the possibility that the state of the switching circuit may be switched at an unintended time is reduced and as a result, the possibility that an erroneous operation may be performed in the liquid ejecting apparatus is reduced.

In the liquid ejecting head control circuit according to the aspect, the state selection signal may include n-bit first data and n-bit second data, and the switching control circuit may output the state selection signal in which the first data is the same as the second data for the second time period.

According to this liquid ejecting head control circuit, since the switching control circuit outputs the state selection signal including the n-bit first data and the n-bit second data that are the same for the second time period, even when a signal to switch between the first data and the second data at an unintended time is input to the liquid ejecting head, the possibility that the state of the switching circuit may be switched is reduced. Therefore, the possibility that an erroneous operation may be performed in the liquid ejecting apparatus is further reduced.

In the liquid ejecting head control circuit according to the aspect, all logic levels of n bits of the first data may be the same.

According to this liquid ejecting head control circuit, since the switching control circuit outputs the state selection signal in which the n-bit first data and the n-bit second data are the same for the second time period and in which all the logic levels of the n bits of the first data are the same, even when an unintended signal is input to the liquid ejecting head, the possibility that the state of the switching circuit may be switched is reduced. Therefore, the possibility that an erroneous operation may be performed in the liquid ejecting apparatus is further reduced.

In the liquid ejecting head control circuit according to the aspect, the switching timing signal may define the timing of switching whether the switching circuit switches whether to supply the drive signal to the drive element based on the first data or switches whether to supply the drive signal to the drive element based on the second data.

According to this liquid ejecting head control circuit, even when the switching timing signal defines the timing of switching whether the switching circuit switches whether to supply the drive signal to the drive element based on the first data or switches whether to supply the drive signal to the drive element based on the second data, the possibility that the state of the switching circuit may be switched is reduced and thus the possibility that an erroneous operation may be performed in the liquid ejecting apparatus is reduced.

In the liquid ejecting head control circuit according to the aspect, the liquid ejecting head may include a storage circuit, and the switching control circuit may control the storage circuit in the second time period.

According to this liquid ejecting head control circuit, even when the storage circuit is controlled in the second time period, the possibility that the state of the switching circuit may be switched is reduced and thus the possibility that an erroneous operation may be performed in the liquid ejecting apparatus is reduced.

A liquid ejecting apparatus according to an aspect includes a liquid ejecting head including a drive element that is driven based on a drive signal to cause a liquid to be ejected from a nozzle, and a switching circuit that switches whether to supply the drive signal to the drive element, and a liquid ejecting head control circuit that controls the liquid ejecting head. The liquid ejecting head control circuit includes a drive signal output circuit that outputs the drive signal, and a switching control circuit that controls the switching circuit. The switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal. The state selection signal for a first time period for which the liquid ejecting head is controlled so as to eject the liquid from the nozzle is different from the state selection signal for a second time period for which the liquid ejecting head is controlled so as not to eject the liquid from the nozzle.

According to this liquid ejecting apparatus, since the state selection signal for the first time period for which the liquid ejecting head control circuit controls the liquid ejecting head so as to eject the liquid from the nozzle is different from the state selection signal for the second time period for which the liquid ejecting head control circuit controls the liquid ejecting head so as not to eject the liquid from the nozzle, the possibility that the state of the switching circuit may be switched at an unintended time is reduced and as a result, the possibility that an erroneous operation may be performed in the liquid ejecting apparatus is reduced.

What is claimed is:

1. A liquid ejecting head control circuit that controls a liquid ejecting head including a drive element that is driven based on a drive signal to cause a liquid to be ejected from a nozzle, and a switching circuit that switches whether to supply the drive signal to the drive element, comprising:

a drive signal output circuit that outputs the drive signal; and a switching control circuit that controls the switching circuit, wherein the switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal, and the state selection signal for a first time period for which the liquid ejecting head is controlled so as to eject the liquid from the nozzle is different from the state selection signal for a second time period for which the liquid ejecting head is controlled so as not to eject the liquid from the nozzle.

2. The liquid ejecting head control circuit according to claim 1, wherein the state selection signal includes n-bit first data and n-bit second data, and the switching control circuit outputs the state selection signal in which the first data is the same as the second data for the second time period.

3. The liquid ejecting head control circuit according to claim 2, wherein all logic levels of n bits of the first data are the same.

4. The liquid ejecting head control circuit according to claim 2, wherein the switching timing signal defines the timing of switching whether the switching circuit switches whether to supply the drive signal to the drive element based on the first data or switches whether to supply the drive signal to the drive element based on the second data.

5. The liquid ejecting head control circuit according to claim 1, wherein the liquid ejecting head includes a storage circuit, and the switching control circuit controls the storage circuit in the second time period.

6. A liquid ejecting apparatus comprising:

a liquid ejecting head including a drive element that is driven based on a drive signal to cause a liquid to be ejected from a nozzle, and a switching circuit that switches whether to supply the drive signal to the drive element; and a liquid ejecting head control circuit that controls the liquid ejecting head, wherein the liquid ejecting head control circuit includes a drive signal output circuit that outputs the drive signal, and a switching control circuit that controls the switching circuit, the switching control circuit outputs an ejection control signal defining an amount of the liquid to be ejected from the nozzle, a switching timing signal defining switching timing of the switching circuit, and a state selection signal defining a state of the switching circuit in a control period defined by the switching timing signal, and the state selection signal for a first time period for which the liquid ejecting head is controlled so as to eject the liquid from the nozzle is different from the state selection signal for a second time period for which the liquid ejecting head is controlled so as not to eject the liquid from the nozzle.

* * * * *